(12) United States Patent
Yasui et al.

(10) Patent No.: US 7,577,732 B2
(45) Date of Patent: Aug. 18, 2009

(54) INFORMATION DISTRIBUTION SERVICE PROVIDING SYSTEM

(75) Inventors: Yutaka Yasui, Kawasaki (JP); Norio Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 940 days.

(21) Appl. No.: 10/775,482

(22) Filed: Feb. 9, 2004

(65) Prior Publication Data
US 2005/0021845 A1   Jan. 27, 2005

(30) Foreign Application Priority Data
Mar. 28, 2003   (JP) .............................. 2003-089499

(51) Int. Cl.
*G06F 15/173* (2006.01)
(52) U.S. Cl. ...................... 709/223; 709/224; 709/203; 455/428; 455/433
(58) Field of Classification Search ................ 709/223, 709/224, 203, 217; 455/428, 433
See application file for complete search history.

(56) References Cited

U.S. PATENT DOCUMENTS

| 7,010,500 B2 * | 3/2006 | Aarnio ........................ 705/26 |
| 2003/0014213 A1 | 1/2003 | Yokota |
| 2003/0060214 A1 * | 3/2003 | Hendrey et al. ............. 455/456 |
| 2006/0248188 A1 * | 11/2006 | Nickerson et al. ........... 709/224 |
| 2007/0042770 A1 * | 2/2007 | Yasui et al. ................. 455/428 |

FOREIGN PATENT DOCUMENTS

| JP | 2001-217787 | 8/2001 |
| JP | 2002-15215 | 1/2002 |
| JP | 2002-216021 | 8/2002 |

* cited by examiner

*Primary Examiner*—Lashonda T Jacobs
(74) *Attorney, Agent, or Firm*—Katten Muchin Rosenman LLP

(57) ABSTRACT

An information provider instructs a server system of an information distribution region and attributes of service users, monitors, based upon position information from service users, the state of distribution of service users who have the above-mentioned attributes and are present in the information distribution region designated by the information provider, and distributes prescribed information to mobile information terminals of the service users based upon the state of distribution of the service users.

4 Claims, 23 Drawing Sheets

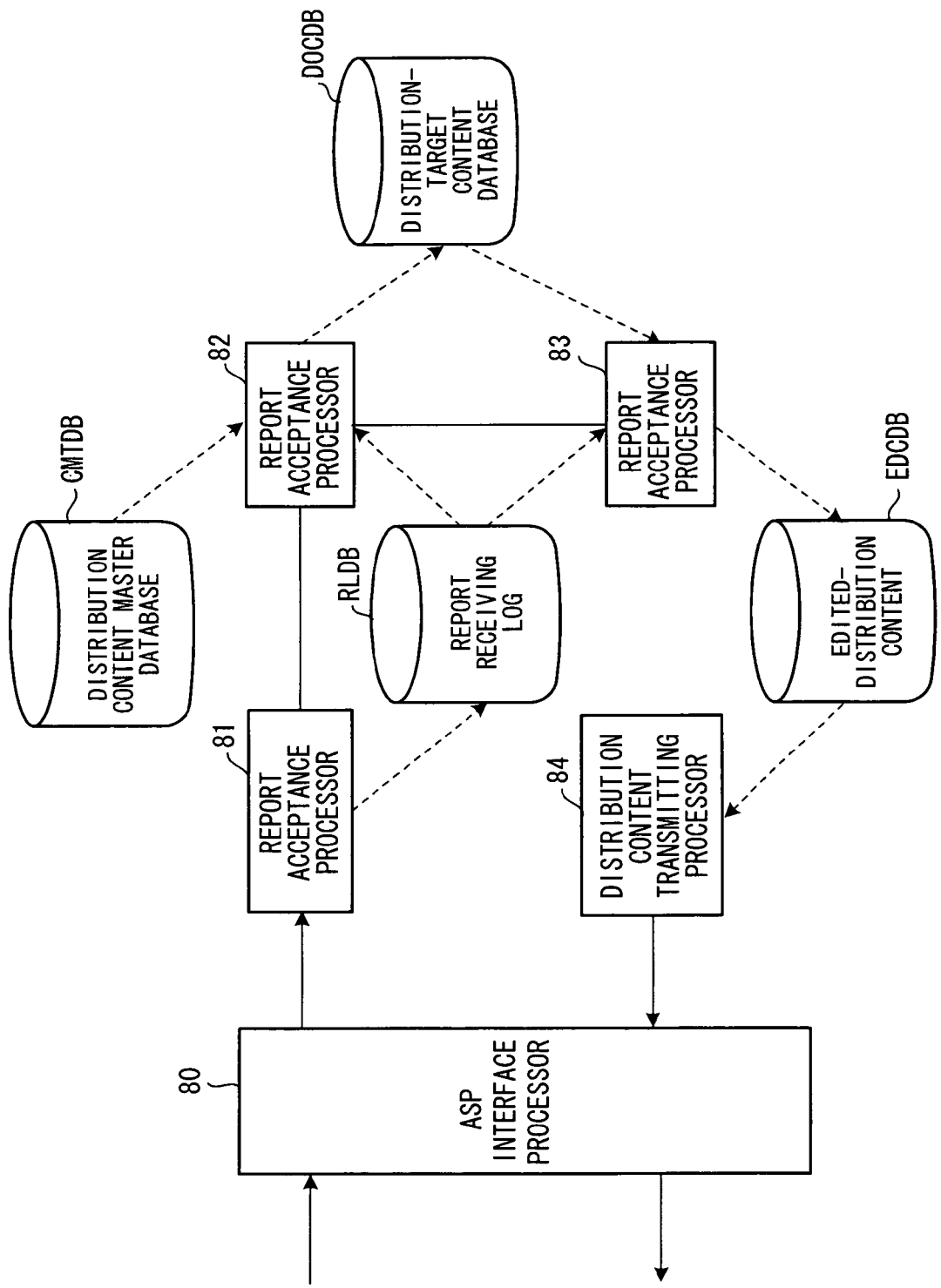

INFORMATION DISTRIBUTION SERVICE PROVIDING SYSTEM

BACKGROUND OF THE INVENTION

This invention relates to a system for providing an information distribution service. More particularly, the invention relates to a service providing system that makes it possible to appropriately select information that is useful for the user of a mobile information terminal such as a mobile telephone, distribute this information to the terminal and raise the effectiveness of such distribution on the side that distributes the information.

The spread of the Internet combined with the growing popularity of mobile information terminals such as mobile telephones that are capable of utilizing Internet services such as electronic mail has given new promise to the future of services that provide these mobile information terminals with information such as advertisements that conform to time, place and circumstances. Furthermore, as a result of the fact that a mobile information terminal the position of which can be ascertained highly precisely has been put into practical use, the realization of such services is at hand.

With information distribution services according to prior art of the kind proposed heretofore in Japanese Patent Application Laid-Open No. 2002-216021 and Japanese Patent Application No. 2002-88432, it is presumed that information will be distributed to a group of terminals in any area at any time. Though it is assumed to some extent that a terminal will move with time, how a number of terminals will move as a group is not taken into account.

With regard to the distribution of advertisements, it is desired that the effectiveness of such distribution be grasped quantitatively to the greatest extent possible. Though the effectiveness of advertisements through the conventional mass media has been measured, the accuracy of such measurements has been very low. Furthermore, usually the time at which the measurement is made is a considerably long period of time after the advertisement was distributed and it is conceivable that the accuracy of the measurement as such time will not be high.

In a conventional system that provides an information distribution service, there are a large number of service users and a large number of information providers, and each of the information service providers distributes a plurality of announcement messages to the service users under respectively different conditions. Information distribution services are carried out as follows in the prior art:

① Utilization of the particular service is registered or contracted between a service user and the operator of a server system and between the operator of the server system and the information provider. The server system distributes appropriately an advertisement desired by the information provider to a prescribed service user located in a prescribed area.

② The server system constantly receives position information concerning service users and, shortly before a time specified by the information provider, selects from among the service users those that match users who reside in a designated area and for which an attribute has been designated by the information provider.

③ A list of the service users selected in ② above is sent from the server system to the information provider, the information provider narrows down the list further and then distributes information to the service users in the list.

The goal of distributing information is to enhance the recognition of a product or company in the hope that this will lead to sales activity. The desire of a party requesting message distribution is to acquire an objective appraisal regarding the effectiveness of information distribution, to ascertain a distribution method that will maximize the effectiveness of distribution, and to measure the effectiveness of information distribution as precisely as possible and in a short period of time.

The conventional method of distributing information is to distribute information to a service user located in a designated area at a designated time. Adopting a busy shopping area where it is evident that people will gather as an area targeted beforehand for distribution will promise greater effectiveness than distributing the information uniformly over a wide area. However, a useful method has yet to be found with regard to evaluating the effectiveness of such distribution or with regard to what distribution method should be employed to enhance the effectiveness of distribution.

SUMMARY OF THE INVENTION

Accordingly, an object of the present invention is to provide a method of objectively evaluating the effectiveness of information distribution.

Another object of the present invention is to so arrange it that an information provider can be given advice regarding a target area for information distribution and content of distributed information based upon the evaluation method, and to so arrange it that a service for furnishing this advice can be provided for pay.

A further object of the present invention is not only to distribute information only to an area decided at a predetermined time but also to make possible information distribution based upon the following points ①, ② and ③:

① The distribution of mobile information terminals at a certain time is ascertained and a region of high terminal density or a region in which a large number of users are located is reported to an information provider to prompt the distribution of information.

② By ascertaining the movement of mobile information terminals as a group, this movement is predicted and proposed to the information provider in such a manner that at a time judged to be a suitable number of hours ahead of a time at which a large number of users will gather in a certain a region, an advertisement will be distributed to the area where the users who will gather at the above-mentioned region are located. (Here a high advertising effect can be expected at a later time.)

③ A method of evaluating, quantitatively to some degree, how the movement of the group of mobile information terminals changed owing to the advertisement is presented and data obtained by this method is furnished to the information provider.

In accordance with the present invention, the foregoing objects are attained by designating, from an information provider to a server system, distribution conditions such as an information distribution region and attributes of service users; monitoring, based upon position information from service users, the state of distribution of service users who have the above-mentioned attributes and are present in the information distribution region designated by the information provider; and distributing distribution information of the information provider to mobile information terminals of the service users based upon the state of distribution of service users.

Further, according to the present invention, the foregoing objects are attained by providing an information distribution service providing system for distributing information, which has been requested by an information provider, from a server system to mobile information terminals of service users, the service providing system having a server system that includes (a) means having an interface, which is for sending and receiving various information to and from an information provider, for receiving via this interface a distribution condition such as a region designated by the information provider, and storing this distribution condition; (b) means having an interface, which is for sending and receiving various information to and from a mobile information terminal possessed by a service user, for receiving position information of the service user sent via this interface autonomously or in response to an inquiry from the server system, and storing this position information; (c) means for extracting and storing a service user located in a region that has been designated by the information provider; (d) means for dividing the region that has been designated by the information provider into zones of suitably small area and storing the region as a set of the zones; (e) means for identifying service users located in each of the zones, calculating an attribute-by-attribute distribution density of the service users on a per-zone basis, and storing the distribution densities; (f) means for reporting prescribed information to the information provider based upon the calculated distribution density and variance of each attribute; (g) means for receiving and storing location of the information provider; (h) means for receiving and storing information desired to be distributed from the information provider; (i) means for receiving, from the information provider, distribution conditions such as attributes of service users to whom information is to be distributed and distribution-destination information; and (j) means for extracting service users, to whom information is to be distributed, based upon the distribution conditions such as the attributes and distribution-destination information, and transmitting to these users the information that has been received from the information provider.

As means for calculating the user attribute-by-attribute distribution density, the present invention includes means for obtaining and storing the area of the designated region; means for extracting users who have a designated attribute from among service users located in the designated region, and storing the number of these users; and means for calculating distribution density and variance using the area obtained and the number of users having the designated attribute, and storing the distribution density.

Alternatively, as means for calculating the user attribute-by-attribute distribution density and variance, the present invention includes means for dividing a designated region into a plurality of zones of small area, expressing and storing the zones as a set of data that enables the area of each zone to be calculated, obtaining the areas of these zones and storing the same; means for extracting users who have the designated attribute from among service users located in any zone, and storing the number of these users; and means for calculating distribution density using the area obtained and the number of users having the designated attribute, and storing the distribution density and variance.

The server system further includes means for accepting an information request that relates to the state of distribution of user attributes for which an effect such as an increase in sales is hoped for by the information provider as a result of information distribution in a region designated by the information provider or by a server system operator.

The server system further includes means for storing user attribute-by-attribute distribution density time-series change in scattering in a region designated by the information provider or by a server system operator.

The server system further includes means for accepting and storing reaction of a user to distributed information.

The server system further includes means for estimating distance between a region for which the distribution density has been calculated and location or sales hub of the information provider; means for calculating a time element such as time required for a user to move from a region for which the distribution density has been calculated to the location or sales hub of the information provider; means for creating and editing, from the result of calculation, a recommendation regarding content of information distributed by the information provider; and means for reporting the content of the created recommendation to an information provider.

The server system further includes means for performing information distribution based upon a reference determined in advance from actual number of users who reside in each zone or a reference that has been designated by the information provider or server system operator.

Other features and advantages of the present invention will be apparent from the following description taken in conjunction with the accompanying drawings.

BRIEF DESCRIPTION OF THE DRAWINGS

FIG. 30 is a diagram illustrating the configuration of a system on the side of a content provider according to the eighth embodiment.

DESCRIPTION OF THE PREFERRED EMBODIMENTS (A) Configuration of Network System

Figure 1:
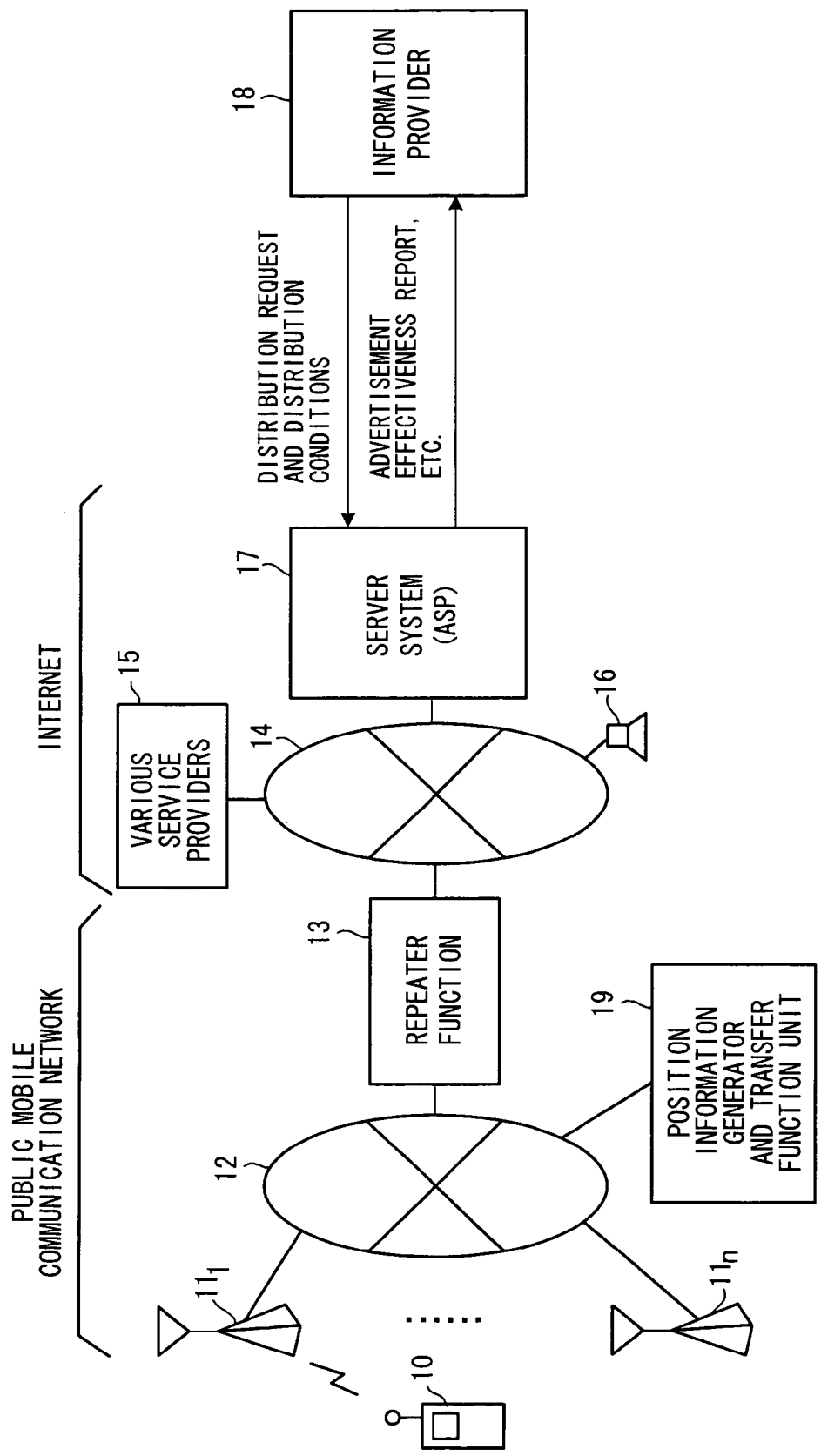
FIG. 1 illustrates and example of the configuration of a network system to which the present invention is applied.

FIG. 1 illustrates an example of the configuration of a network system to which the present invention is applied. A mobile information terminal 10 such as a mobile telephone or PDA in FIG. 1 has a voice communication and data communication function in a public mobile communication network 12 as well as the functions of an Internet access terminal (functions for WWW access inclusive of character, still-picture, moving-picture, voice and music data, etc., a display function, a function for voice-signal playback and a function for sending and receiving electronic mail). At the time of communication, the mobile information terminal 10 is connected to the public mobile communication network 12 via base stations $11_1$ to $11_n$ in radio areas in which they reside.

Internet 14 is a communication network that transfers packet data using TCP/IP. A repeater function 13 serves as a gateway for interfacing the public mobile communication network 12, which performs circuit switching mainly for voice communication, with the Internet 14, which performs packet switching mainly for data communication.

A service provider 15, which is constituted by a server or the like operated and managed by an ordinary ISP (Internet Service Provider), provides subscribers with a web service (HTTP) and E-mail service (SMTP, POP), etc. A terminal 16 indicates a personal computer connected to the Internet 14 via the public mobile communication network 12, or via an Internet connection service such as OCN, or from an intracorporate network, etc.

An information distribution server system (ASP: Application Service Provider) 17 distributes information to a plurality of persons located in a specific radio area, i.e., to each of the users of the mobile information terminal 10, this information being strongly related to this area. The server system (ASP) 17 has a database constituted by area-limited distribution information from an information provider 18 (described later), user registration information that is based upon the preferences of each terminal user, and present-position information from mobile information terminals that are capable of accessing the Internet.

The server system (ASP) 17 has all the various functions of an Internet server operated and managed by the ISP 15 and provides the appropriate service to each user of the mobile information terminal 10 from which the system 17 is access via the Internet 14 and public mobile communication network 12 using a function that provides various Internet services and various processing functions for implementing this function. In the description that follows, the ASP 17 and its operator will be treated as a single entity, and the mobile information terminal 10 and its user also will be treated as a single entity.

The information provider 18 is a provider of advertising information for which the targeted region is limited. For example, information providers 18 include the owners of department stores or retailers in a specific region from among ordinary advertising agencies. These individuals specify various distribution conditions such as the class of users of the mobile information terminal 10 who desire distribution of advertisement information, the preferences of these users, the specific region, zone or radio area, and the timing and time zone of distribution, and request the server system 17 for distribution. It should be noted that the network components of the public mobile communications network and Internet in the usual sense of these terms are indicated together at the top of FIG. 1.

A position information generator and transfer function unit 19 has a function for generating and transferring position information relating to the mobile information terminal 10. The unit 19 possesses this function independently as part of the mobile information terminal or as a function of the public mobile communication network. An example of the unit 19 is a position information center. The position information is information for designating position with enough accuracy to provide a service. For example, the information may be data such as longitude and latitude. Methods of generating the information indicating the position of the mobile information terminal 10 are well known. For example, such a method is disclosed in Nikkei Communications, Jan. 20, 2003, pp. 130 to 131. The server system 17 is capable of obtaining terminal position information without being aware of the method used for measurement.

In the information distribution service providing system having the above-described network configuration, the server system (ASP) 17 distributes information automatically to the mobile information terminal 10 in the designated area. This information is that desired for distribution by the information provider 18 and conforms to the preferences of the terminal user. For example, the server system (ASP) 17 implements the information distribution service in accordance with points 1) to 3) below in the information distribution service mode indicated in the prior art.

1) The user of the mobile information terminal 10 registers reception conditions in the database of the server system 17 beforehand through a predetermined procedure. The reception conditions include an indication that the user desires the provision of an information distribution service, the minimum necessary information (e.g., gender and age bracket) relating to the user, and the desired information content (e.g., the genre of the information).

2) The information provider 18, besides designating the information distribution area, also registers various distribution conditions in the server system 17. These conditions include the distribution date and time zone, the class of users at the destination of distribution and the preferences of these users, the type of information providing means, such as a WWW service, and the type of information transmission medium, such as voice or moving pictures.

3) The server system 17 judges the distribution conditions designated by the information provider 18 and the reception conditions indicated by the terminal user from among the registered mobile information terminals 10, extracts mobile communication terminals that match these conditions, further extracts only mobile information terminals 10 located in the area designated by the information provider 18, and distributes individual specific information to each terminal user. As a result, it is possible to distribute information having a high degree of advertising effectiveness for both the source of information distribution and the destination of this information.

Figure 2:
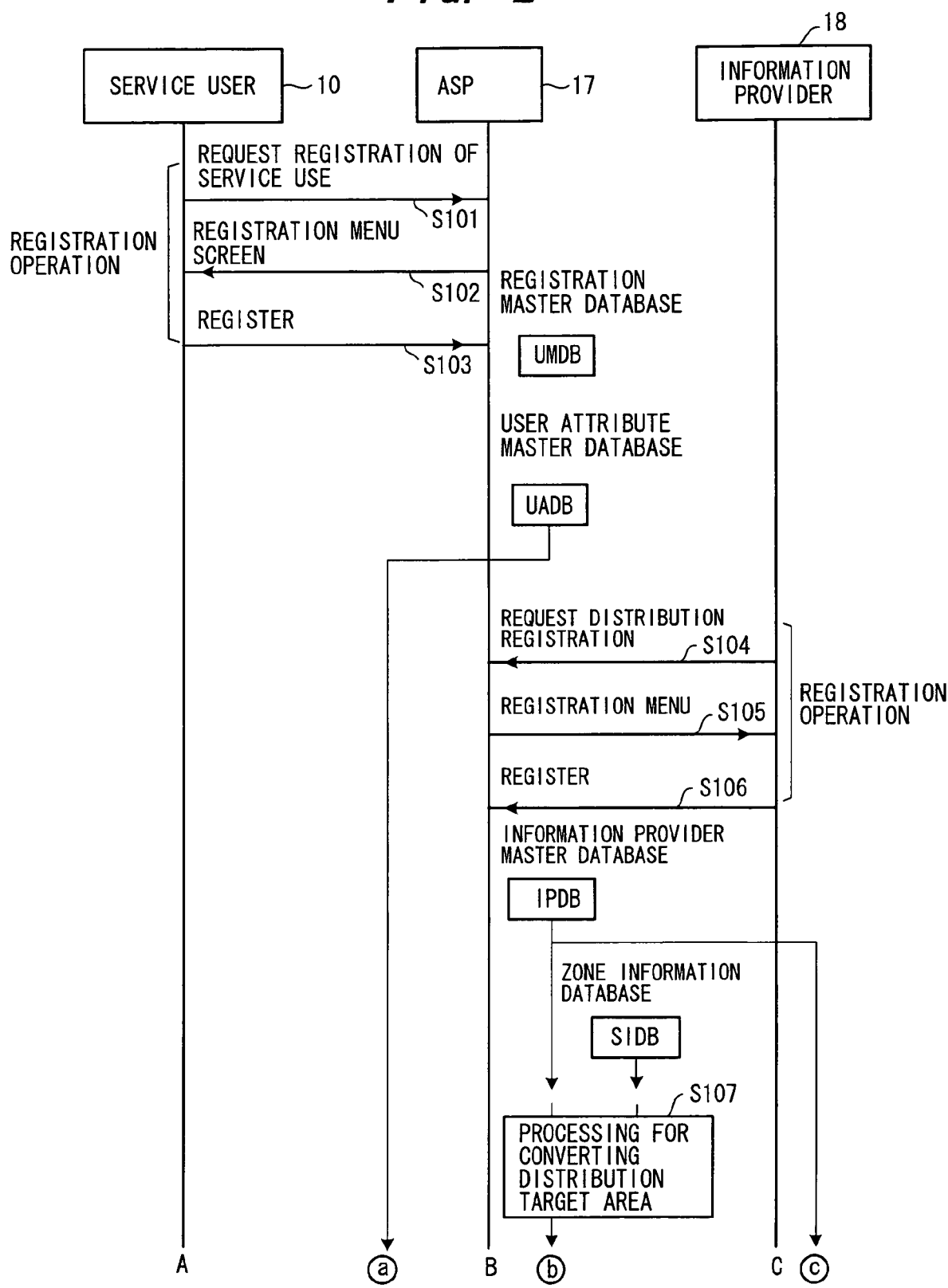
FIG. 2 is a first flowchart illustrating operation in a case where a server system (ASP) to which the present invention is applied provides an information distribution service.
Figure 3:
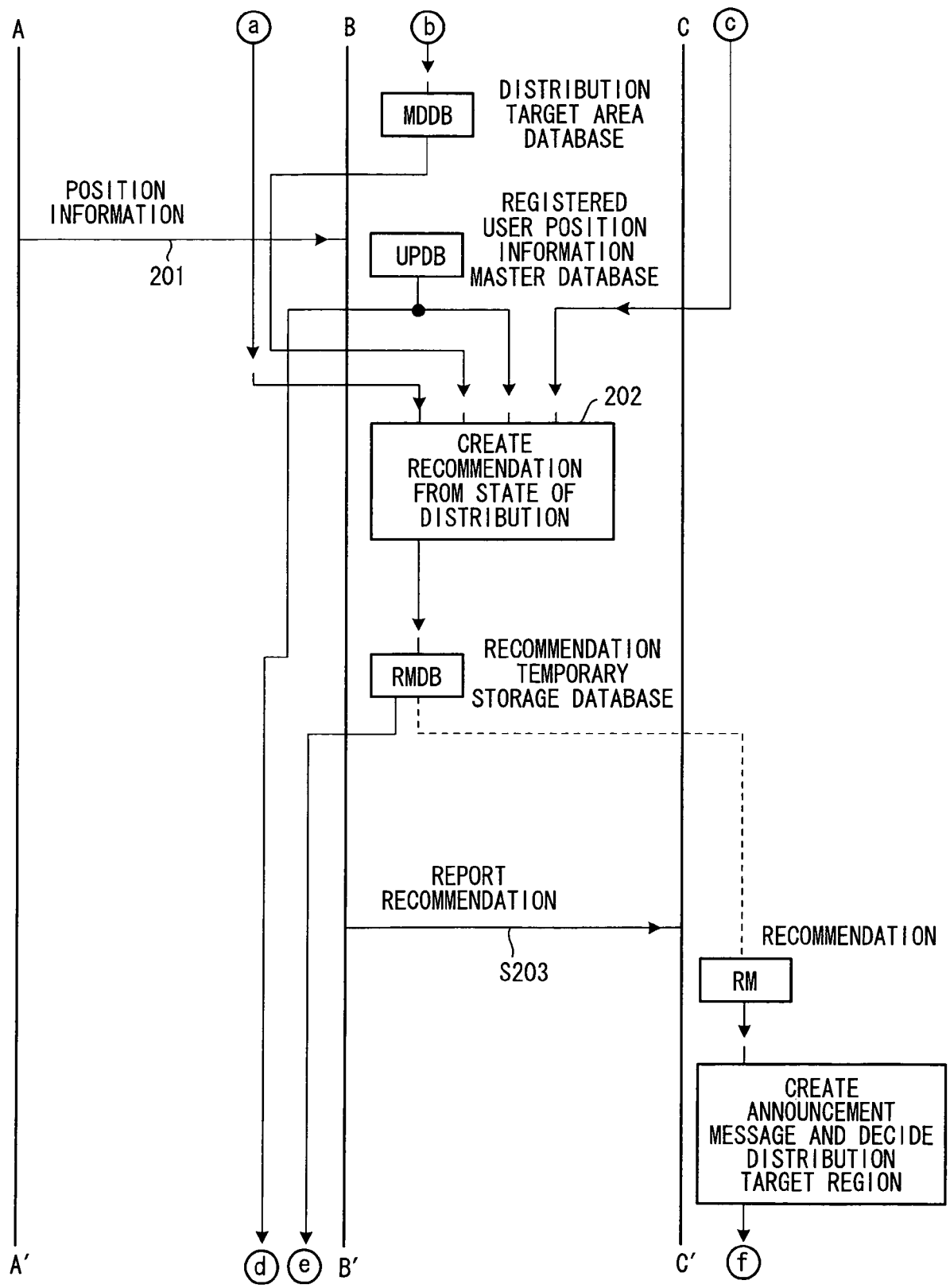
FIG. 3 is a second flowchart illustrating operation in a case where the server system (ASP) to which the present invention is applied provides an information distribution service.
Figure 4:
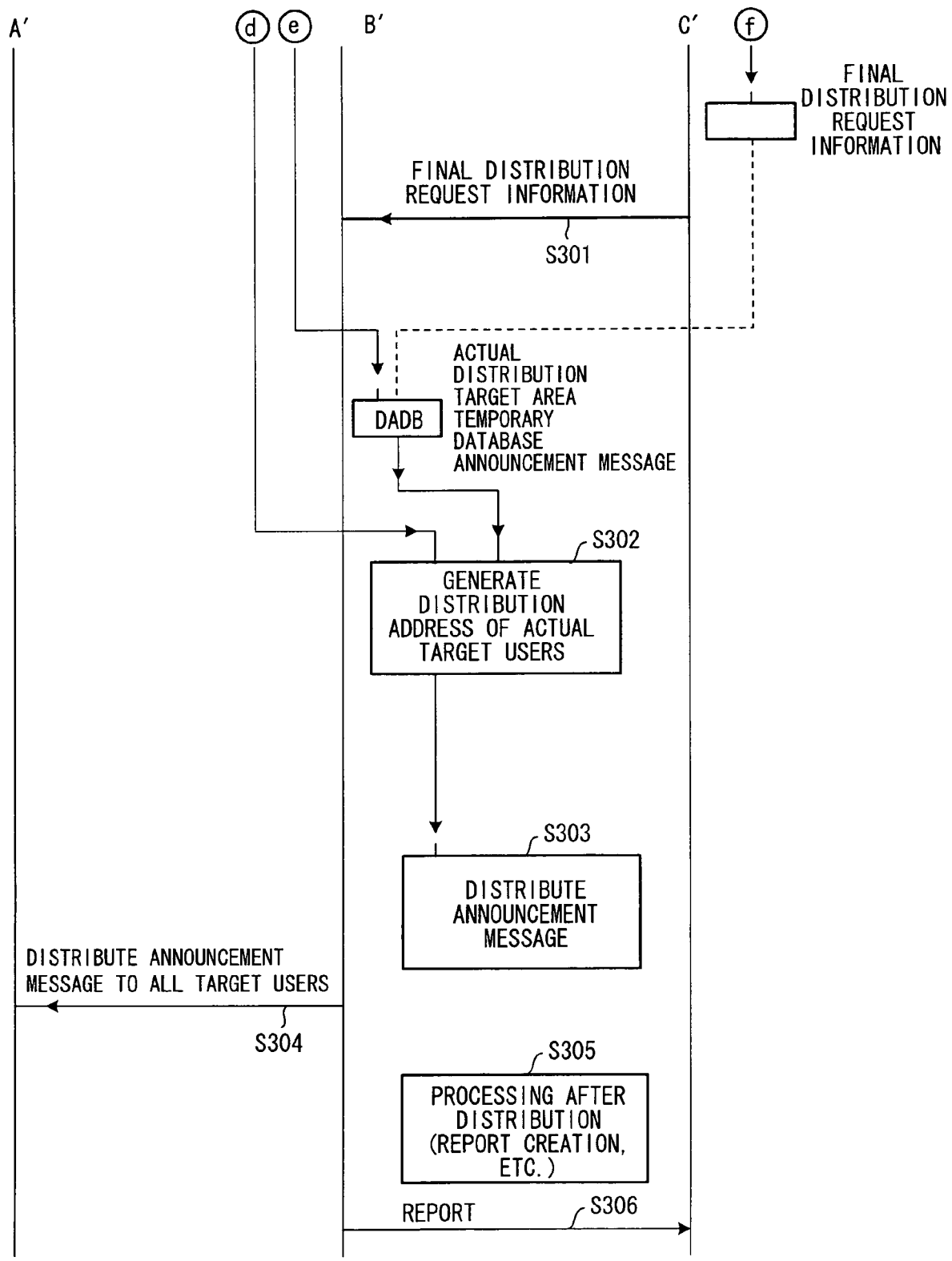
FIG. 4 is a third flowchart illustrating operation in a case where the server system (ASP) to which the present invention is applied provides an information distribution service.

(B) Operation of Information Distribution Service According to the Present Invention FIGS. 2 to 4 are flowcharts of operation in a case where an information distribution service is provided by the server system (ASP) 17 to which the present invention is applied.

In order to perform the information distribution service according to the present invention, the service user (mobile information terminal) 10 registers utilization of the information distribution service beforehand with regard to the server system (ASP) 17. This procedure is well known. For example, registration may be performed through a procedure indicated in the specification of Japanese Patent Application Laid-Open No. 2002-216021 entitled "Server System for Distributing Information to Mobile Information Terminals in Specific Area".

The service user of the mobile information terminal 10 sends a service request according to the present invention to a base station 11$n$ in the public mobile communication network 12 in which this terminal is located, the request being sent as by dialing a special number for this service. The service request is sent to the ASP 17 via the public mobile communication network 12, repeater function 13 and Internet 14 (S101). Upon receiving the service request, the ASP 17 displays a service registration screen, which employs a web service based upon, e.g., the HTTP protocol, on a display unit of the mobile information terminal 10 (S102).

The service user refers to the registration menu screen displayed on the display unit of the mobile information terminal 10, enters registration anew, a change or a pause. If registration is entered anew, the service user enters the genre (category) of the advertisement desired to be distributed, his or her gender, age and occupation, etc., and follows a user registration procedure. In response, the mobile information terminal 10 transmits the registered content to the ASP 17 (S103).

The ASP 17 stores the registered information concerning the user in a user master database UMDB as new registration data, classifies the user according to attribute and stores the latter in a user attribute master database UADB.

On the other hand, in order to implement the information distribution service according to the present invention, it is assumed that the information provider 18 and ASP 17 have entered into an agreement concerning the distribution of information. This procedure is well known. For example, registration may be performed through a procedure indicated in the specification of Japanese Patent Application Laid-Open No. 2002-216021 entitled "Server System for Distributing Information to Mobile Information Terminals in Specific Area". FIG. 2 describes an overview of the procedure for requesting the distribution of any announcement message. In the description that follows, it will be assumed that an announcement message and conditions such as the target of distribution from the information provider 18 are delivered to the ASP 17 as electronic data via the network. Though it is possible to deliver the above to the ASP 17 via a physical medium such as a paper medium or floppy disk, all of this data will still be converted to electronic data and processed within the ASP 17 and so it is justified to consider that the data is electronic from the outset.

The information provider 18 sends the ASP 17 a request to register distribution of a certain announcement message (S104), and the ASP 17 responds by sending a registration menu to the information provider 18 (S105). From the registration menu the information provider 18 enters or selects a condition such as the targeted person to which the announcement message is to be distributed and sends the result to the ASP 17, where the result is registered (S106). The ASP 17 retains this information as an information provider master database IPDB.

In the embodiment of FIGS. 2 to 4, the case illustrated is one in which the announcement message is not registered at the time distribution registration is requested. Rather, at the time the distribution target region or zone is finalized, the announcement message is sent to the ASP 17 along with a list of target regions. However, a method of registering the announcement message beforehand can be adopted as another embodiment.

Data that has been registered in the information provider master database IPDB as a distribution target area by the information provider 18 is converted to a set of unit zones (S107) using data in separately provided zone information SIDB and stored in a distribution target area database MDDB by the ASP 17.

Position information relating to the mobile information terminal 10 registered by the service user is received by the ASP 17 constantly (S201), the latter updating the position information in a registered user position information master database UPDB.

①The ASP 17 converts this position information to zone identification information using the zone information in a zone information database SIDB and retains this information as terminal distribution data on a per-unit-zone basis. ②On the basis of the terminal distribution data for each unit zone, the ASP 17 accumulates the attributes of the service users, who are the owners of these terminals, on a per-attribute basis by referring to the user attribute master database UADB. ③Further, the ASP 17 calculates the area of each unit zone and the area of the overall target region and uses these results to express, as numerical values, the states of distribution of each unit zone and of the overall region with regard to each attribute. A method of calculating these distribution states will be described later. ④On the basis of the numerical values obtained as mentioned above, the ASP 17 creates an information distribution method (target region, message content, distribution timing, frequency of distribution, etc.), which it is assumed will enhance the effectiveness of distribution for the information provider 18, as a recommendation and stores this recommendation RM in a recommendation temporary storage database RMDB. The above constitutes step 202.

Next, the ASP 17 reports the recommendation RM to the information provider 18 (S203). On the basis of a recommendation RM reported, the information provider 18 decides an actual distribution target area as necessary, creates an announcement message and sends the information of the actual distribution target area and the announcement message to the ASP 17 (S301).

The ASP 17 stores the received actual distribution target area information in an actual distribution target area temporary database DADB. The ASP 17 subsequently selects terminals having the pertinent attributes in the actual distribution target area, generates the distribution address of the actual distributes (S302), executes processing for distributing the announcement message (S303) and distributes the announcement message to all of the targeted users (S304).

The ASP 17 subsequently records answers from the terminals to which the information has been distributed and executes processing such as statistical processing, thereby creating a report to the information provider 18 (S305), and communicates this report to the information provider 18 in appropriate fashion (S306).

(C) Processing by ASP (a) Processing for Registering Service Users

Figure 5:
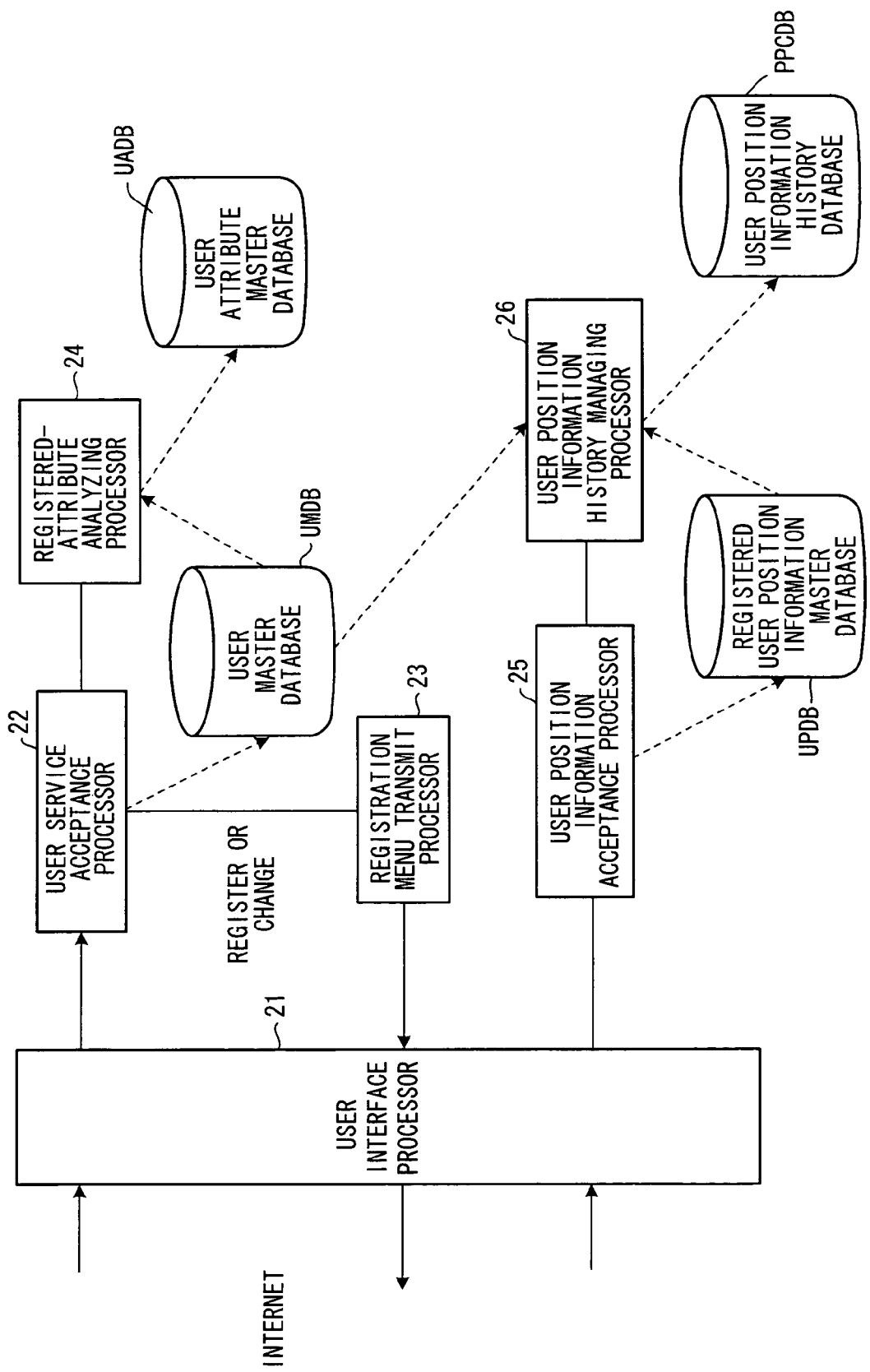
FIG. 5 is a diagram useful in describing processing for registering a service user.

In the ASP 17, as shown in FIG. 5, a user interface processor 21 sends and receives information mainly to and from the mobile information terminal 10 via the Internet 14 and delivers received data to a corresponding processor in dependence upon the content of the received data.

A user service acceptance processor 22 accepts from the mobile information terminal 10 a request for new registration or change of service, a request for start, temporary suspension or cancellation of service, etc., and a registration menu to be displayed on the display unit of the mobile information terminal 10 via a registration menu transmit processor 23. Further, the user service acceptance processor 22 stores the result of processing conforming to the type of each request in the user master database UMDB as new registration data or updates existing registration data by the result of processing.

In the case of new registration, the user service acceptance processor 22 reserves an area corresponding to the user in the user position information master database UPDB. A registered-attribute analyzing processor 24 classifies users according to attribute from the data in the user master database UMDB and stores the results in the user attribute master database UADB. The registered attributes of a user are for classifying and identifying information desired to be distributed and include user gender, age and field of interest (category).

(b) Position Registration Processing

In response to the start of service, the user service acceptance processor 22 periodically accepts position information from the user (mobile information terminal) 10 and stores this information in the registered user position information master database UPDB. A user position information history managing processor 26 stores a history of position information for each user in a user position information history database PPCDB.

More specifically, a user position information acceptance processor 25 receives position information of an applicable user from the mobile information terminal 10 of this service user or generated by the corresponding position information center 19 and sent to the server system (ASP) 17 autonomously from time to time or sent in response to a command from the server system, and stores this position information in a database together with related information such as time. Further, the user position information acceptance processor 25 stores the zone of residence so as to facilitate the calculation of data representing the distribution state, calculates the traveling speed per unit time, the direction of travel and the traveling distance, classifies and processes this information appropriately and stores the results in a database.

(c) Processing for Registering Information Provider

Figure 6:
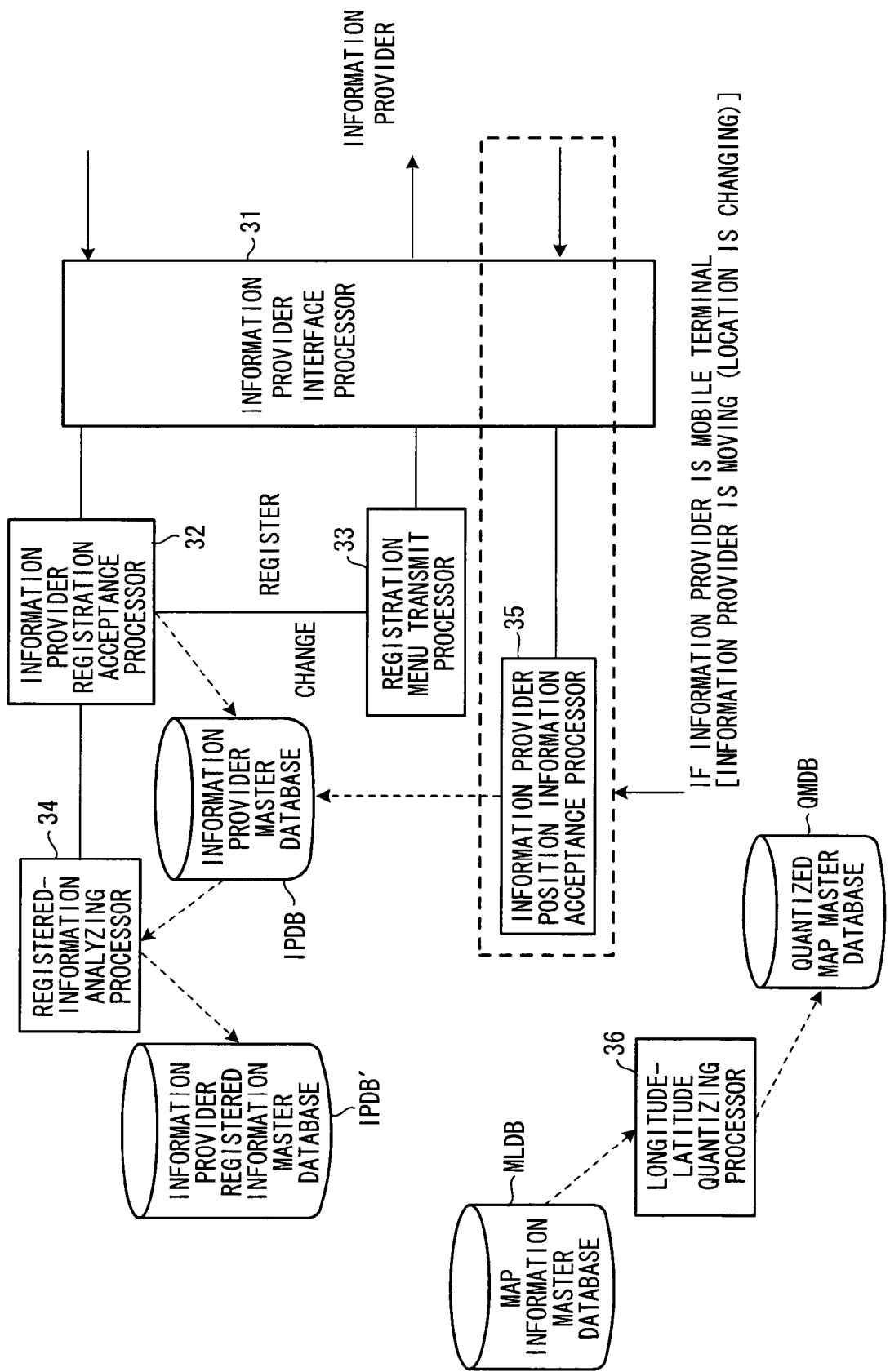
FIG. 6 illustrates processing for registering an information provider.

In the ASP 17, as shown in FIG. 6, an information provider interface processor 31 sends and receives information to and from the information provider 18 and delivers received data to a corresponding processor in dependence upon the content of the received data. An information provider registration acceptance processor 32 accepts "REGISTER", "CHANGE", "PAUSE", "START", "CANCEL", etc., as a distribution request from the information provider 18 and stores the requested registration content in the information provider master database IPDB. If "REGISTER" has been requested or if a "CHANGE" in distribution conditions or content has been requested, a registration menu transmit processor 33 transmits a registration menu screen to the information provider 18.

A registered-information analyzing processor 34 classifies distribution information, which has been stored in the information provider master database (IPDB), according to content and condition and stores the information in an information provider registered information master database (IPDB'). Content registered by the information provider is the distribution area, distribution information and distribution conditions (distribution target and frequency, etc.) and the like.

If, in a case where the information provider 18 is a mobile information terminal, an information provider position information acceptance processor 35 receives the position of the information provider 18, the position information of the information provider that has been stored in the information provider master database (IPDB) is updated.

It should be noted that a method of dividing a certain region into unit zones, assigning a number to each zone and handling this information in association with longitude and latitude is well known. For example, sea-area numbers (Marsden square numbers) have been determined internationally. In terms of businesses, map codes developed by the Denso Corporation are available. Further, one such method is disclosed in the specification of Japanese Patent Application Laid-Open No. 2002-88432.

In this embodiment, map information in a form obtained by digitizing various map information is retained in a map information master database (MIDB), and this information is used upon being converted to a quantized map master database (QMDB) by a longitude-latitude quantizing processor 36 over the entirety of the service target area of the ASP 17 in such a manner that the map information will conform to the processing method of the ASP 17.

(d) Process for Designating Region and for Designating User Attributes

Figure 7:
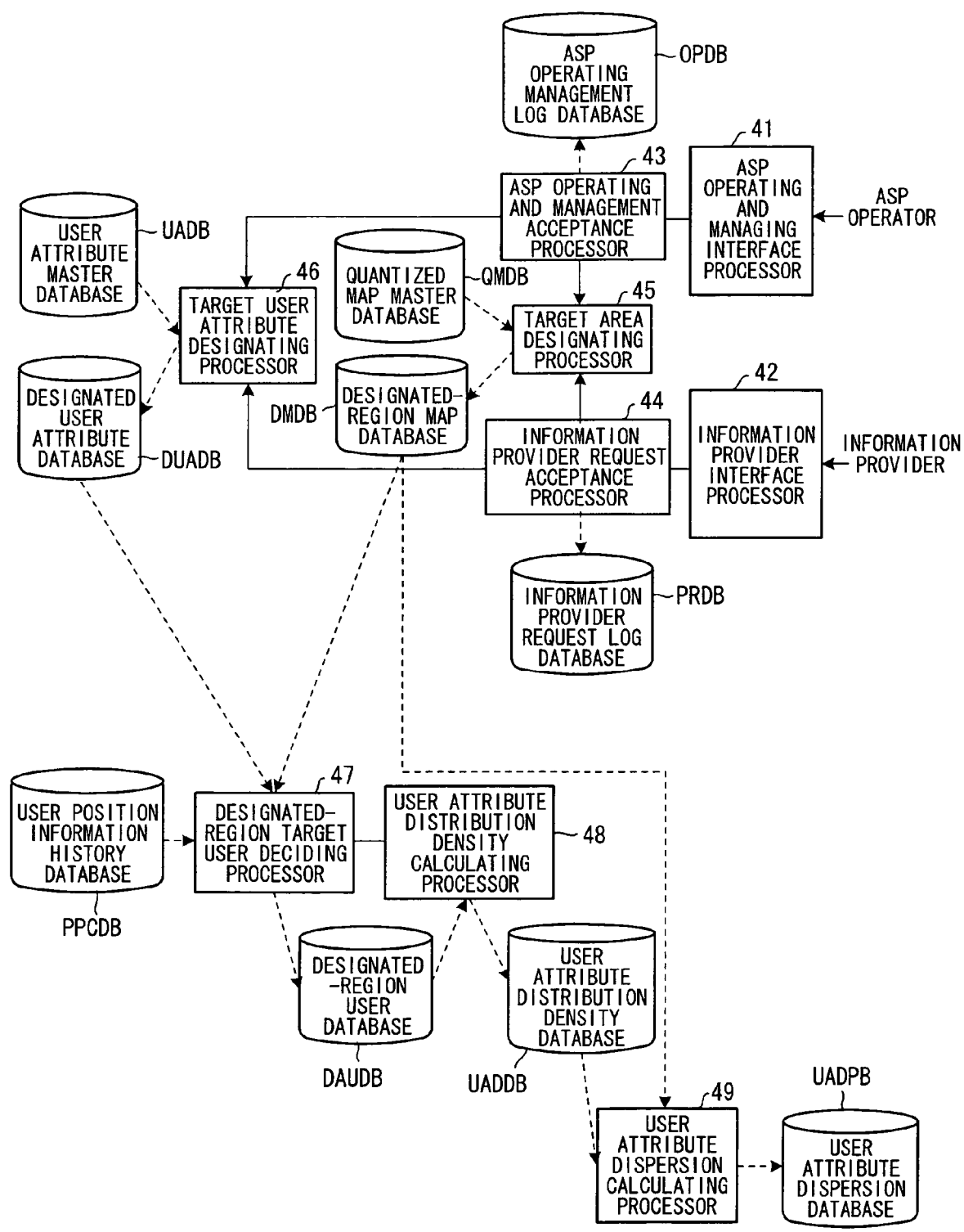
FIG. 7 is a diagram useful in describing a process for designating a region and a user attribute and a process for calculating user-attribute distribution density and user-attribute variance.

FIG. 7 is a diagram showing the structure of the ASP 17 that implements a process for designating a region and user attributes and a process for calculating user-attribute distribution density and user-attribute variance.

If there is a user distribution density request (inclusive of the targeted area and user attributes) from the operator of the server system (ASP) and from the information provider, an ASP operating and managing interface processor 41 and an information provider interface 42 deliver the requests to an ASP operating and management acceptance processor 43 and to an information provider request acceptance processor 44, respectively.

The ASP operating and management acceptance processor 43 and the information provider request acceptance processor 44 accept the requests, log the content thereof in an ASP operating management log database (OPDB) and information provider request database (PRDB), respectively, and request a target area designating processor 45 and a target user attribute designating processor 46 to create a designated-region map and designated-user attributes, respectively. Using the request content and the quantized map master database (QMDB), the target area designating processor 45 obtains a designated region and stores it in a designated-region map database (DMDB). By referring to the request content and the user attributes that have been stored in the user attribute master database (UADB), the target user attribute designating processor 46 obtains a user having designated attributes and stores this user in a designated user attribute database (DUADB). It should be noted that the designated-region map database (DMDB) is stored as a set of data (twodimensional spatial information) in a form in which the area of a designated region can be calculated. A set of unit zones corresponds to this data set.

Examples of expressions of a target region designated by an information provider are as follows:

an area of radius y km centered on Store A (address: Number xx, Kami-Odanaka, Nakahara Ward, Kawasaki City;

an area x km east, y km west, z km south and w km north of Store A (address: Number xx, Kami-Odanaka, Nakahara Ward, Kawasaki City; and Nakahara Ward and Takasu Ward of Kawasaki City.

In any case, in this embodiment a target region is expressed by a set of unit zones in correlation with QMDB within the ASP.

(e) Process for Calculating User-Attribute Distribution Density and User-Attribute Variance Using the designated-region map database (DMDB), designated user attribute database (DUADB) and user position information history database (PPCDB), a designated-region target user deciding processor 47 obtains the distribution of users having designated attributes and being located in a designated region and stores this distribution in a designated-region user database (DAUDB).

A user attribute distribution density calculating processor 48 obtains the distribution density of applicable attributes in a region from the designated-region user database (DAUDB) and stores the density in a user attribute distribution density database (UADDB). Further, a user attribute variance calculating processor 49 obtains the degree of dispersion (variance) of applicable attributes in an applicable region and stores this in a user attribute dispersion database UADPB.

A general formula of distribution density $D_A(X)$ of a user attribute (A) in an applicable region (X) is given by the following equation:

$$D_A(X) = [\text{number of users having the applicable user attribute } (A) \text{ and being located in an applicable region } (X)] \div [\text{area of the applicable region } (X)]$$

Accordingly, in order to calculate the distribution density $D_A(X)$, the user attribute distribution density calculating processor 48 requires ① means for obtaining and storing the area of a designated region, ② means for extracting users having designated attributes from among service users located in a designated region and storing the number of these users, and ③ means for calculating and storing density according to the equation cited above.

Further, a general formula of distribution density $D_A(Xi)$ of a user attribute (A) in a set (X1, X2, . . . , Xm) of unit zones obtained by subdividing a region (X) is given by the following equation:

$$D_A(Xi) = [\text{number of users having the applicable user attribute } (A) \text{ and being located in an applicable unit zone } (Xi)] \div [\text{area of the applicable unit zone } (Xi)]$$

where the areas of X1 to Xm are sufficiently small in comparison with the area of X. Accordingly, in order to obtain user distribution density $D_A(Xi)$ of one unit zone resulting from such subdivision, it is necessary to have ① means for dividing a designated region into a plurality of small-area unit zones in accordance with an appropriate procedure, expressing the unit zones as a set of data in which the area of each zone can be calculated, storing the data, obtaining the areas from this data and storing the areas, ② means for extracting users having designated attributes from among service users located in any unit zone and for storing the number of these users, and ③ means for calculating and storing density according to the equation cited above.

A general formula of variance $S_A(X)$ of a user attribute (A) in an applicable region (X) is given by the following equation:

$$S_A(X) = \sqrt{S_{AX}^2}$$

where the following hold:

$$S_{AX}^2 = \{[(D_A(X1) - D_A(\text{ave.}X)]^2 + [(D_A(X2) - D_A(\text{ave.}X)]^2 + \ldots \ldots [(D_A(Xm) - D_A(\text{ave.}X)]^2\} \div (m-1);$$

m represents the number of unit zones obtained by subdividing the applicable region (X); and $D_A(\text{ave.}X)$ represents the average distribution density of user attribute (A) of the applicable region (X).

It should be noted that in order to simplify the description, the areas of the unit zones are all defined as being equal. Calculation is easy even in a case where the zones are equal in area.

(f) Process for Deciding Targeted Information Provider

Figure 8:
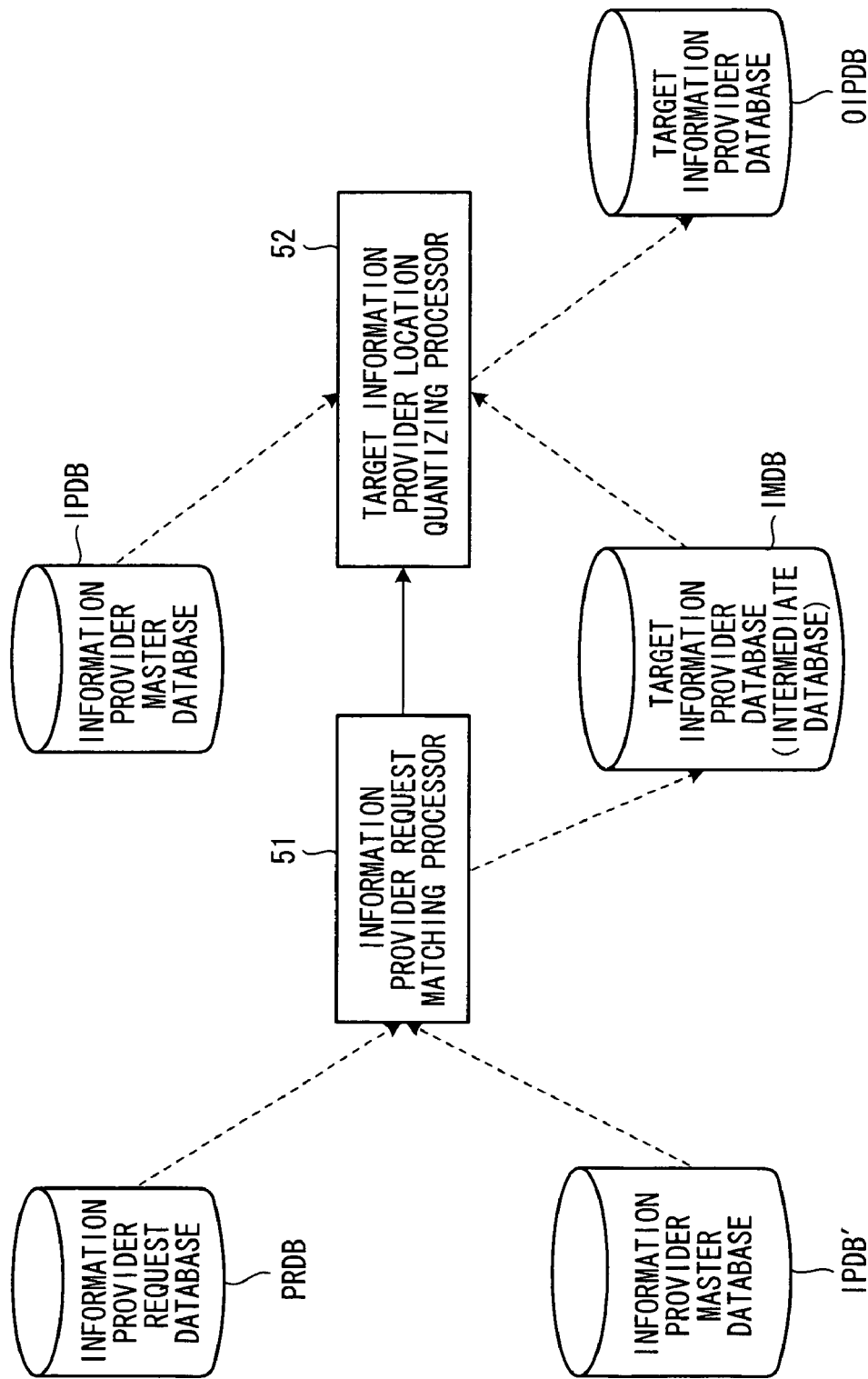
FIG. 8 illustrates a process for deciding a targeted information provider.

FIG. 8 is a diagram showing the structure of the ASP 17 for implementing a process that decides a targeted information provider.

An information provider request matching processor 51 refers to the content of the information provider request log database (PRDB) and the content of the information provider master database (IPDB') to determine whether the content of the request from the information provider 18 conforms to a condition registered beforehand and stores the result of the determination in an intermediate database (IMDB). A target information provider location quantizing processor 52 checks appropriateness such as distance (a geographical condition) between a region designated by a request and the location of the information provider based upon the information provider master database (IPDB) and the content of the request, and stores the result of the check in a target information provider database (OIPDB).

In a case where the result of the check is that a request from an information provider lacks appropriateness, this fact is reported to the information provider that is the source of the request.

Figure 9:
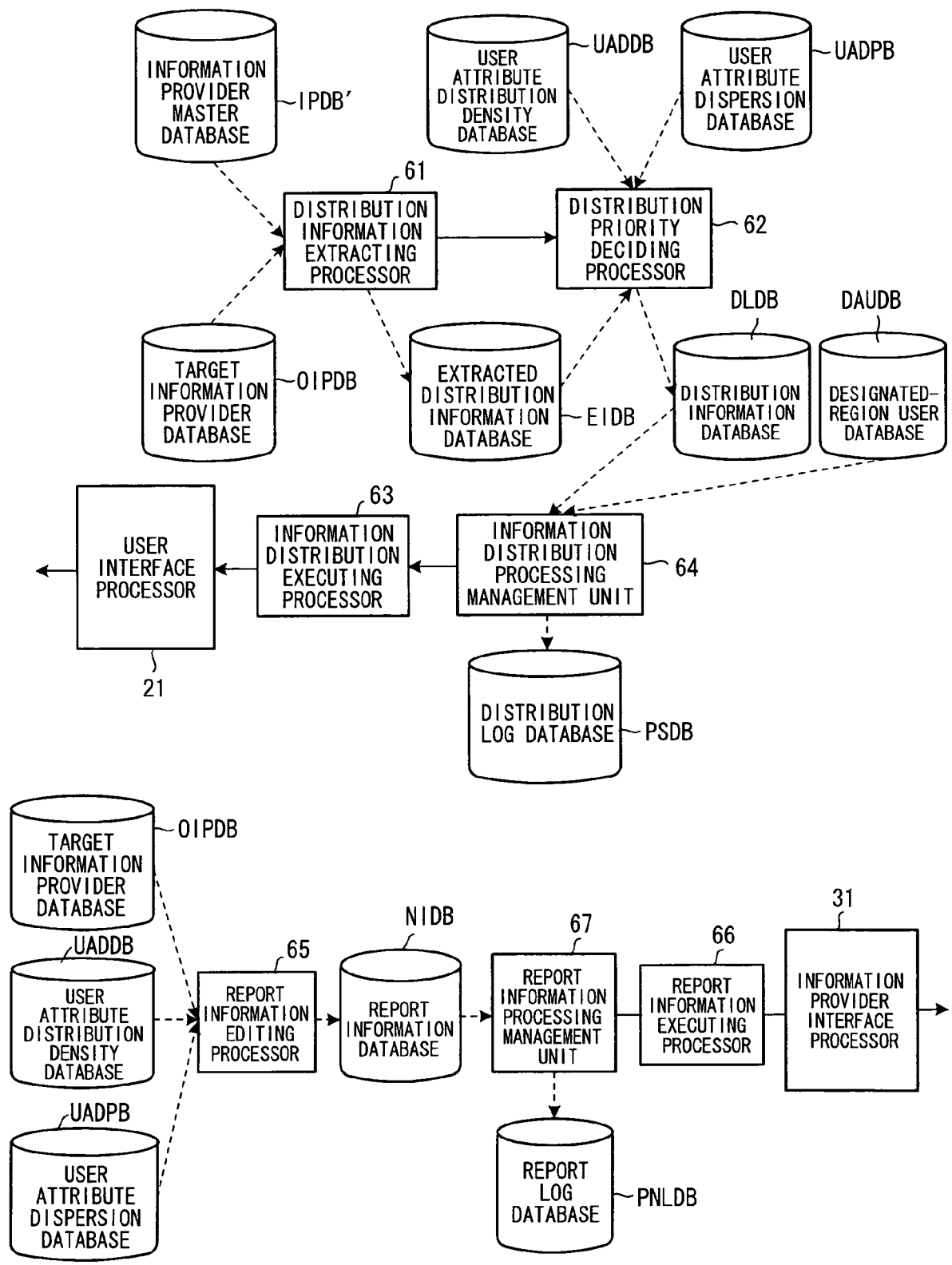
FIG. 9 is a diagram useful in describing a process for deciding a distribution mechanism such as degree of priority and a process for reporting distribution density and variance, etc., classified by user attribute.

(g) Process for Deciding Distribution Mechanism Such as Degree of Priority and Process for Reporting Distribution Density and Variance, etc., Classified by User Attribute FIG. 9 is a diagram showing the structure of the ASP 17 for implementing a process for deciding a distribution mechanism such as degree of priority and a process for reporting distribution density and variance, etc., classified by user attribute.

A distribution information extracting processor 61 refers to distribution information registered beforehand by a targeted information provider, extracts distribution information and stores this information in an extracted distribution information database (EIDB). On the basis of the distribution density and variance of the applicable users, a distribution priority deciding processor 62 decides distribution ranking of distribution information and arranges this in a distribution information database (DLDB).

An information distribution executing processor 63 distributes (pushes) the applicable distribution information to the applicable users via the user interface processor 21, and an information distribution processing management unit 64 records distribution time and number of users to which information has been distributed, etc., in a distribution log database (PSDB).

A report information editing processor 65 edits the distribution density and variance of applicable users and stores the results in a report information database (NIDB). A report information executing processor 66 transmits distribution information to a designated information provider via the information provider interface processor 31, and a report information processing management unit 67 records report time, etc., in a report log database (PNLDB).

In accordance with the state of distribution density (the degree of gathering) of applicable user attributes, the information distribution frequency and a technique such as concentrated distribution in a certain time frame are decided as the method of distribution. For example, zones are selected from among zones of high density and if the accumulation of numbers of users in each of these zones exceeds 50% of the total number of applicable users, then information is distributed to the region up until this figure is achieved.

(h) Process for Processing User Reaction to Distributed Information

Figure 10:
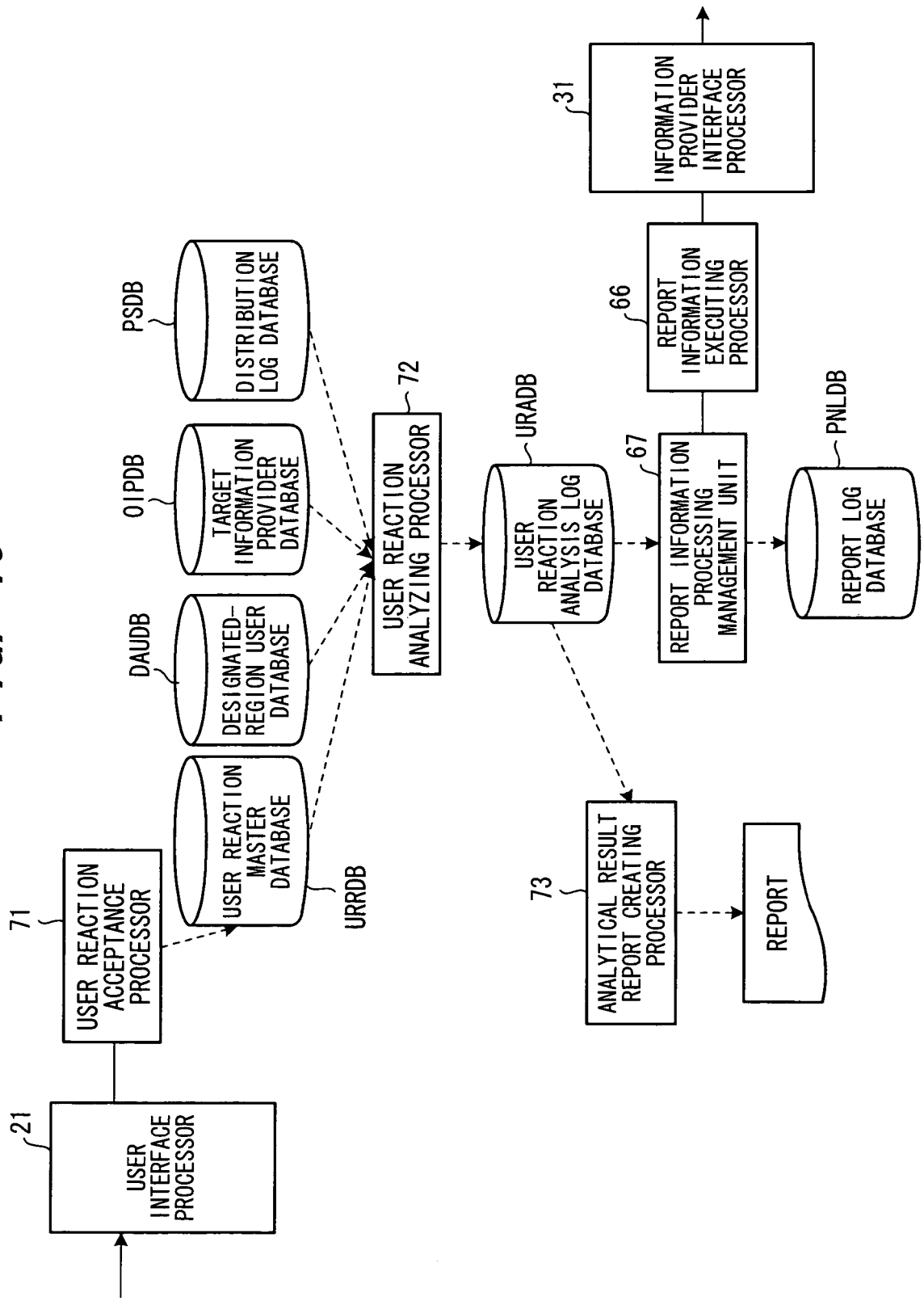
FIG. 10 is a diagram useful in describing a process for processing user reaction to distributed information.

FIG. 10 is a diagram showing the structure of the ASP 17 that executes processing of user reaction to distributed information.

The time it takes for a user to react to distributed information and position (location) information indicative of the vicinity where the reaction was made are analyzed and reported to the applicable information provider. In a case where means (e.g., a cookie) for recording the reaction of a user is provided in distributed information, the reaction of the user can be analyzed.

More specifically, a user reaction acceptance processor 71 accepts reaction to distributed information from a user via the user interface processor 21 and stores the reaction in a user reaction master database (URRDB). A user reaction analyzing processor 72 analyzes user reaction based upon the user reaction master database (URRDB), designated-region user database (DAUDB), target information provider database (OIPDB) and distribution log database (PSDB) and stores the results in a user reaction analysis log database (URADB).

The report information executing processor 66 transmits report information to a designated information provider via the information provider interface processor 31, and the report information processing management unit 67 records the report time, etc., in the report log database (PNLDB). An analytical result report creating processor 73 creates a report of analytical results based upon the results of analysis.

By subjecting analysis of reaction to statistical processing, a new source of earnings for the ASP 17 can be obtained by using this information as marketing information. More specifically, by accepting, storing and analyzing the reaction of users to distributed information, it is possible to objectively evaluate the effectiveness of information distribution. Accordingly, on the basis of this evaluation, an information provider can be furnished with advice regarding a target area of information distribution and the content of distributed information, and this advice service can be furnished for pay.

(D) Embodiment of Technique for Estimating Effectiveness of Information Distribution Embodiments of a technique through which the ASP estimates the effectiveness of information distribution based upon the state of distribution of terminals will now be illustrated.

(a) First Embodiment

In a first embodiment, ① the server system (ASP) decides the order of priority (distribution ranking) of information distribution to a designated region depending upon a difference in distribution density of every attribute registered by a service user located in the designated region.

② In accordance with the distribution density of every attribute of a service user, the server system (ASP) notifies an information provider that has been registered for information announcement that matches this attribute of this fact and prompts the provision of information distributed from the information provider.

Figure 11:
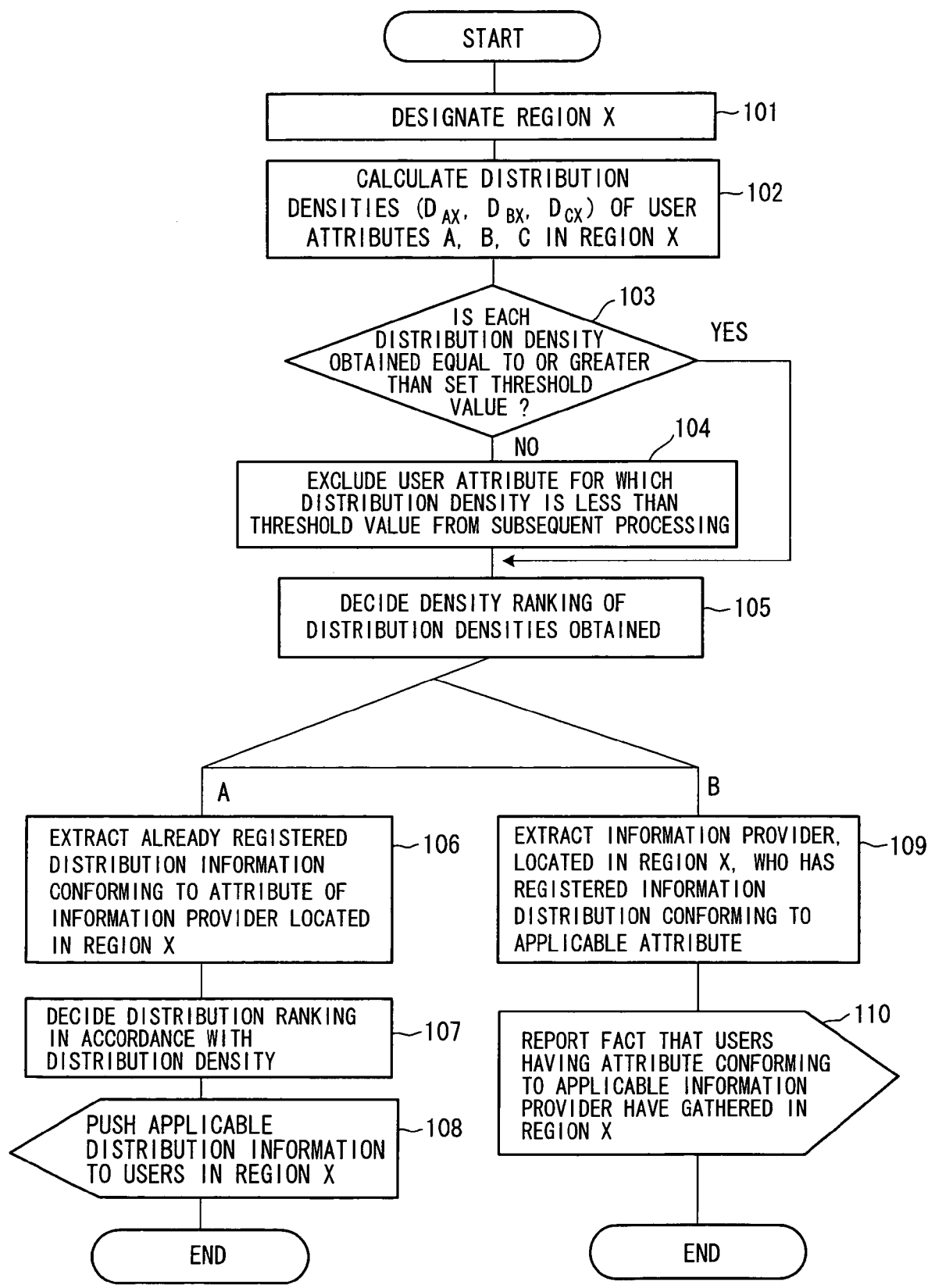
FIG. 11 is a processing flowchart of a first embodiment of the present invention.
Figure 12:
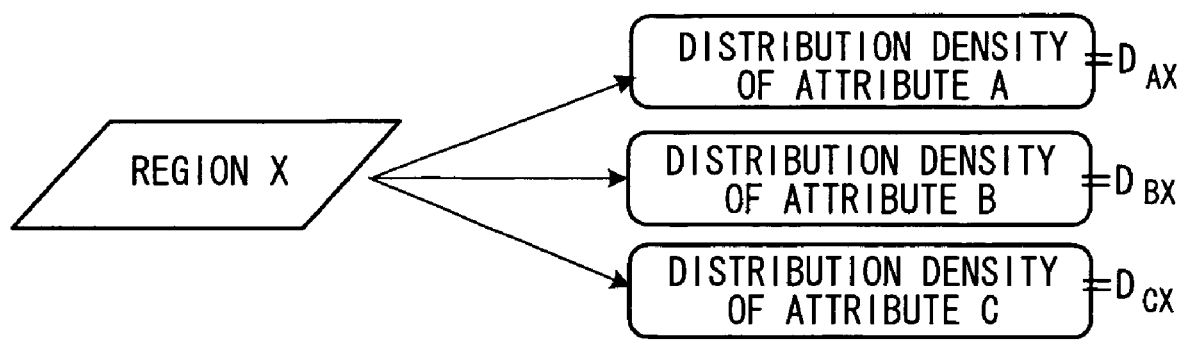
FIG. 12 is a diagram useful in describing distribution density.

FIG. 11 is a flowchart of processing according to the first embodiment. As shown in FIG. 12, assume that distribution densities of attributes A, B and C in a region X are represented by $D_{AX}$, $D_{BX}$ and $D_{CX}$, respectively.

First, the region X is designated (step 101). Next, the distribution densities $D_{AX}$, $D_{BX}$ and $D_{CX}$ of the user attributes A, B and C in the region X are calculated (step 102). If the distribution densities $D_{AX}$, $D_{BX}$ and $D_{CX}$ of these attributes have been obtained, it is determined whether each distribution density obtained is equal to or greater than a set threshold value (step 103). If the distribution density is less than the threshold value, then this distribution density is excluded from subsequent processing (step 104). Next, the density ranking of the distribution densities obtained is decided (step 105). After the density ranking is decided, processing A or B or both processing A and B is executed. Which of these is done depends upon an agreement made with the information provider in advance.

In the flow of processing A, already registered distribution information that conforms to an applicable attribute of an information provider located in region X is extracted (step 106). The ranking of distribution is decided in accordance with the distribution density (step 107) and the applicable distribution information is distributed (pushed) to the users in region X (step 108). If the ranking of the distribution densities is $D_{AX} > D_{BX} > D_{CX}$, then the order of priority for distribution of the applicable distribution information also is made such that information pertaining to attribute A is given the highest priority or highest ranking. The above-described processing is subsequently repeated upon changing the region X.

In the flow of processing B, an information provider that is located in region X and has registered information distribution that conforms to an applicable attribute is extracted (step 109). The fact that users having the attribute conforming to the applicable information provider have gathered in region X is reported (step 110). The above-described processing is subsequently repeated upon changing the region X.

The information provider is extracted at step 109 by using the following logical formula:

(information provider for which information distribution to attribute A has been registered) OR (information provider for which information distribution to attribute B has been registered) OR (information provider for which information distribution to attribute C has been registered). Further, the ranking of distribution density or the distribution density may be reported at step 110.

(b) Second Embodiment (Single Zone and Single Attribute)

Figure 13:
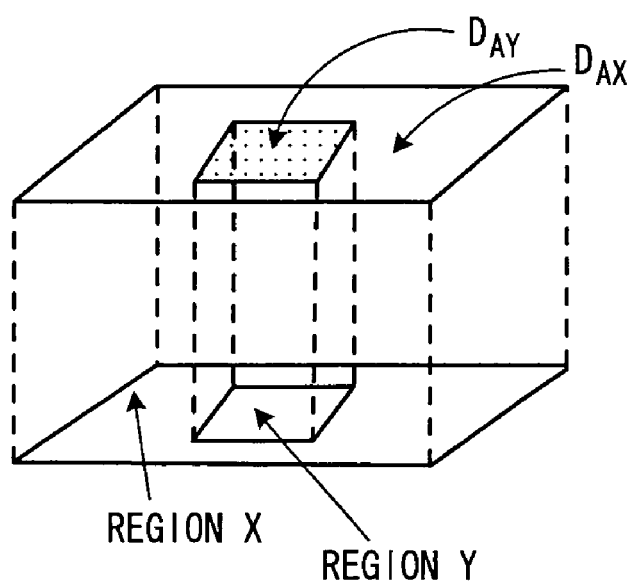
FIG. 13 is a diagram useful in describing a second embodiment of the present invention.

FIG. 13 is a diagram useful in describing a second embodiment.

① The server system (ASP) calculates distribution densities $D_{AX}$, $D_{AY}$ with regard to a certain attribute A in a designated region X and in a zone Y within this region and decides the order of priority (the distribution ranking) of information distribution to these regions X and Y, in a manner similar to that of ①, ② in the first embodiment, based upon the difference between densities. However, it is assumed here that the area of region X is sufficiently larger than that of zone Y (i.e., X>>Y).

② An information provider that has been registered for announcement information that matches the attribute of a user is notified of this fact and is prompted to provide distribution information.

Figure 14:
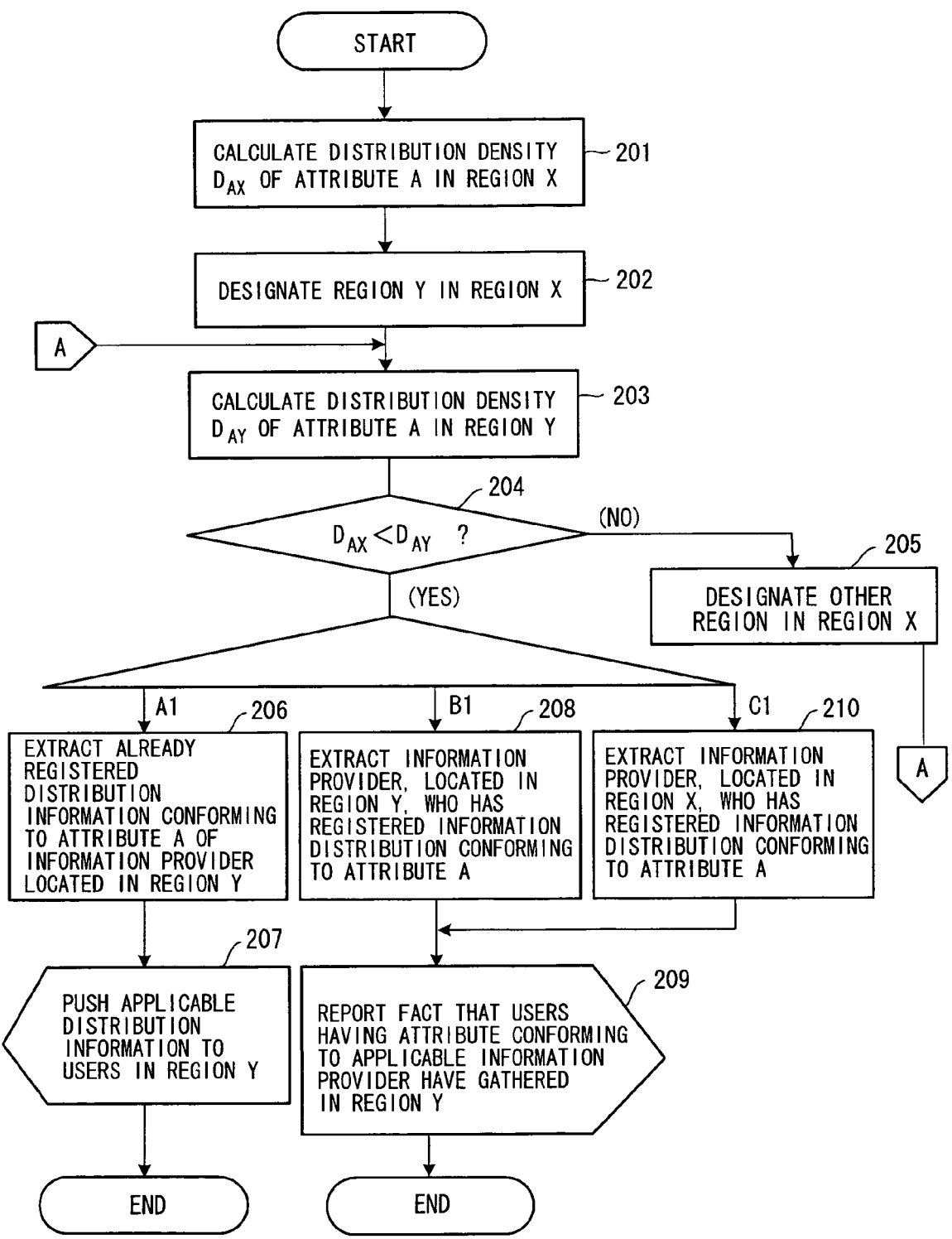
FIG. 14 is a processing flowchart of the second embodiment.

FIG. 14 is a flowchart of processing according to the second embodiment.

First, the distribution density $D_{AX}$ of attribute A in region X is calculated (step 201). Next, region Y in region X is designated (step 202) and the distribution density $D_{AY}$ of attribute A in region Y is calculated (step 203).

The distribution density $D_{AX}$ and the distribution density $D_{AY}$ are compared and it is determined whether $D_{AX} < D_{AY}$ holds (step 204). If $D_{AX} \geq D_{AY}$ holds, another region in region X is designated (step 205) and processing from step 203 onward is repeated.

If $D_{AX} < D_{AY}$ holds, on the other hand, this means that the distribution density of attribute A is higher in region Y than in the surrounding region (the entirety of region X). In other words, this means that a greater number of service users for which attribute A has been registered have gathered in region Y than in the surroundings. In such case processing A1, B1, C1, for example, is executed in the order mentioned. Which of processing A1, B1, C1 is executed depends upon an agreement with the information provider.

In the flow of processing A1, already registered distribution information that conforms to attribute A of an information provider located in region Y is extracted (step 206). Next, the applicable distribution information is distributed (pushed) to the users in region Y (step 207).

In the flow of processing B1, an information provider that is located in region Y and has registered information distribution that conforms to attribute A is extracted (step 208). The fact that users having the attribute conforming to the extracted information provider have gathered in region Y is reported to the this information provider (step 209).

In the flow of processing C1, an information provider that is located in region X and has registered information distribution that conforms to attribute A is extracted (step 210). The fact that users having the attribute conforming to the extracted information provider have gathered in region Y is reported to the this information provider (step 209). By distributing the applicable distribution information to users in region X, priority is given to distribution to users located in region Y.

After the processing of steps 207, 209 is executed, another region in region X is designated or the attribute is changed and then processing similar to that above is executed.

(c) Third Embodiment (Single Zone and Plural Attributes)

Figure 15:
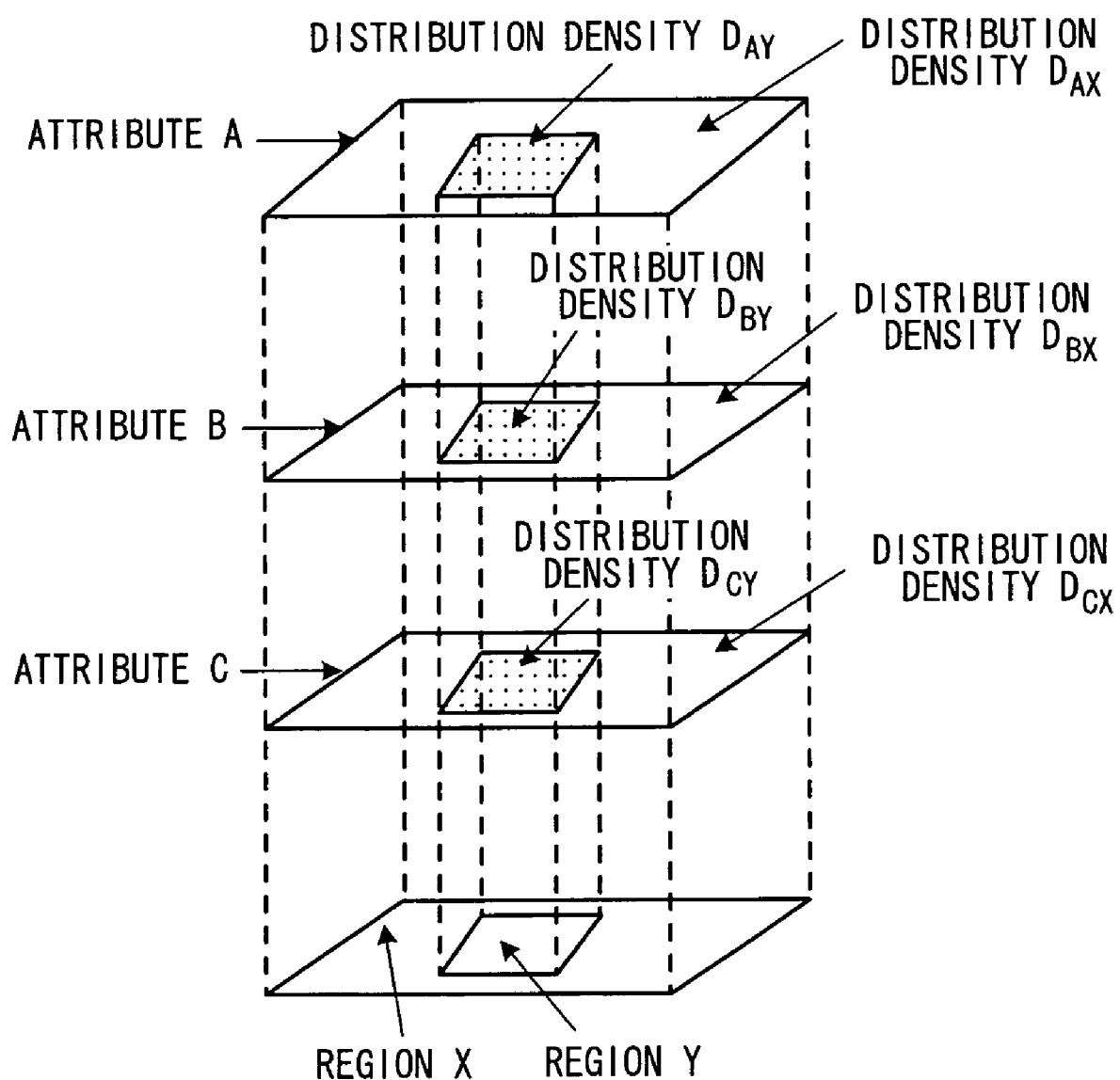
FIG. 15 is a diagram useful in describing a third embodiment of the present invention.

FIG. 15 is a diagram useful in describing a third embodiment.

① The server system (ASP) decides the order of priority (the distribution ranking) of information distribution to region X based upon differences in distribution density of a plurality of attributes in designated region X and in zone Y within this region. However, it is assumed here that the area of region X is sufficiently larger than that of zone Y (i.e., X>>Y).

② An information provider that has been registered for announcement information that matches the attributes of a user is notified of this fact and is prompted to provide distribution information.

Figure 16:
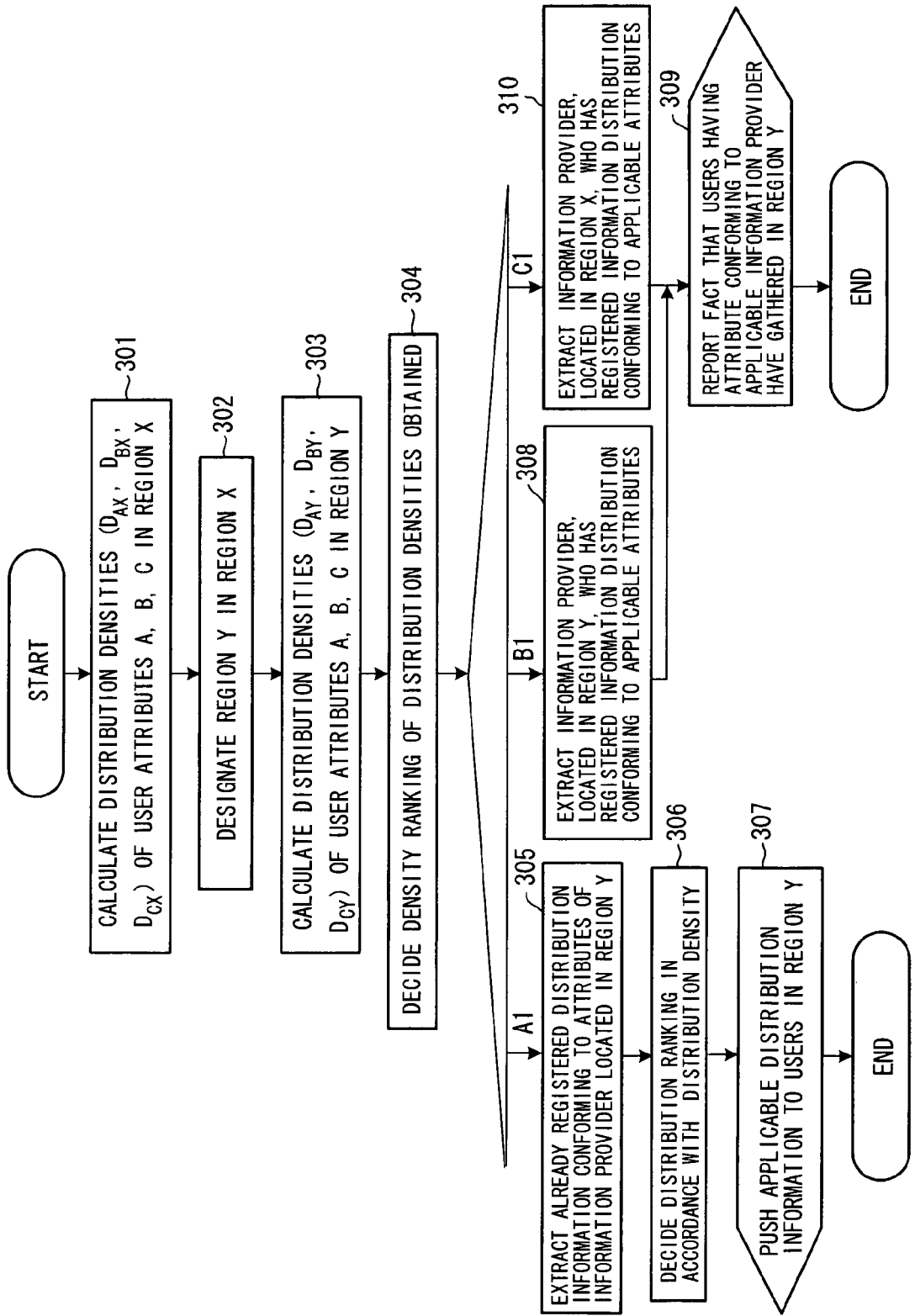
FIG. 16 is a processing flowchart of the third embodiment.

FIG. 16 is a flowchart of processing according to the third embodiment.

First, distribution densities ($D_{AX}$, $D_{BX}$ and $D_{CX}$) of user attributes A, B and C in region X are calculated (step 301). Next, region Y in region X is designated (step 302) and distribution densities ($D_{AY}$, $D_{BY}$ and $D_{CY}$) of user attributes A, B and C in region Y are calculated (step 303). If calculation of distribution densities is completed, the density ranking of the distribution densities obtained is decided (step 304). It is assumed that the distribution densities $D_{AY}$, $D_{BY}$, $D_{CY}$ are larger than corresponding distribution densities $D_{AX}$, $D_{BX}$, $D_{CX}$ respectively.

Processing A1, B1, C1 is thenceforth executed in the order mentioned. Which of processing A1, B1, C1 is executed depends upon an agreement with the information provider.

In the flow of processing A1, already registered distribution information that conforms to attributes A, B, C of an information provider located in region Y is extracted (step 305). Next, the ranking of distribution is decided in accordance with the distribution density (step 306) and the applicable distribution information is distributed (pushed) to the users in region Y (step 307).

Next, an information provider that is located in region Y and has registered information distribution that conforms to applicable attributes is extracted (step 308) and the fact that users having the attributes conforming to the applicable information provider have gathered in region Y is reported (step 309).

An information provider that is located in region X and has registered information distribution that conforms to applicable attributes A, B, C is thenceforth extracted (step 310) and the fact that users having the attributes conforming to the applicable information provider have gathered in region Y is reported (step 309).

If the ranking of the distribution densities is $D_{AY} > D_{BY} > D_{CY}$, for example, then the order of priority for distribution of the distribution information also is made such that information pertaining to attribute A is given the highest priority or highest ranking.

(d) Fourth Embodiment (Plural Zones and Single Attribute)

Figure 17:
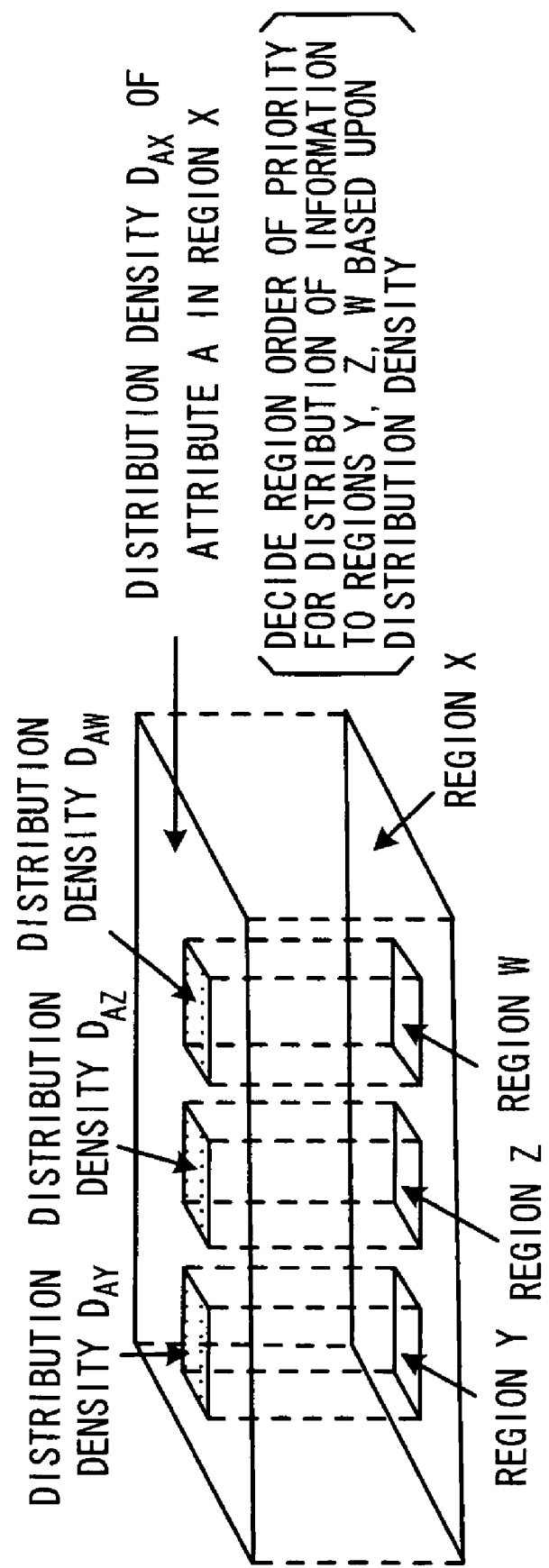
FIG. 17 is a diagram useful in describing a fourth embodiment of the present invention.

FIG. 17 is a diagram useful in describing a fourth embodiment.

① The system server (ASP) decides the order of priority (the distribution ranking) of information distribution to regions Y, Z, W based upon differences in distribution density of a certain attribute A in designated region X and in zones Y, Z, W in this region (where it is assumed that the area of region X is sufficiently larger than that of zones Y, Z, W).

② The server system (ASP) notifies an information provider that has been registered for announcement information that matches the attribute of the user of this fact and prompts the provision of distribution information.

Figure 18:
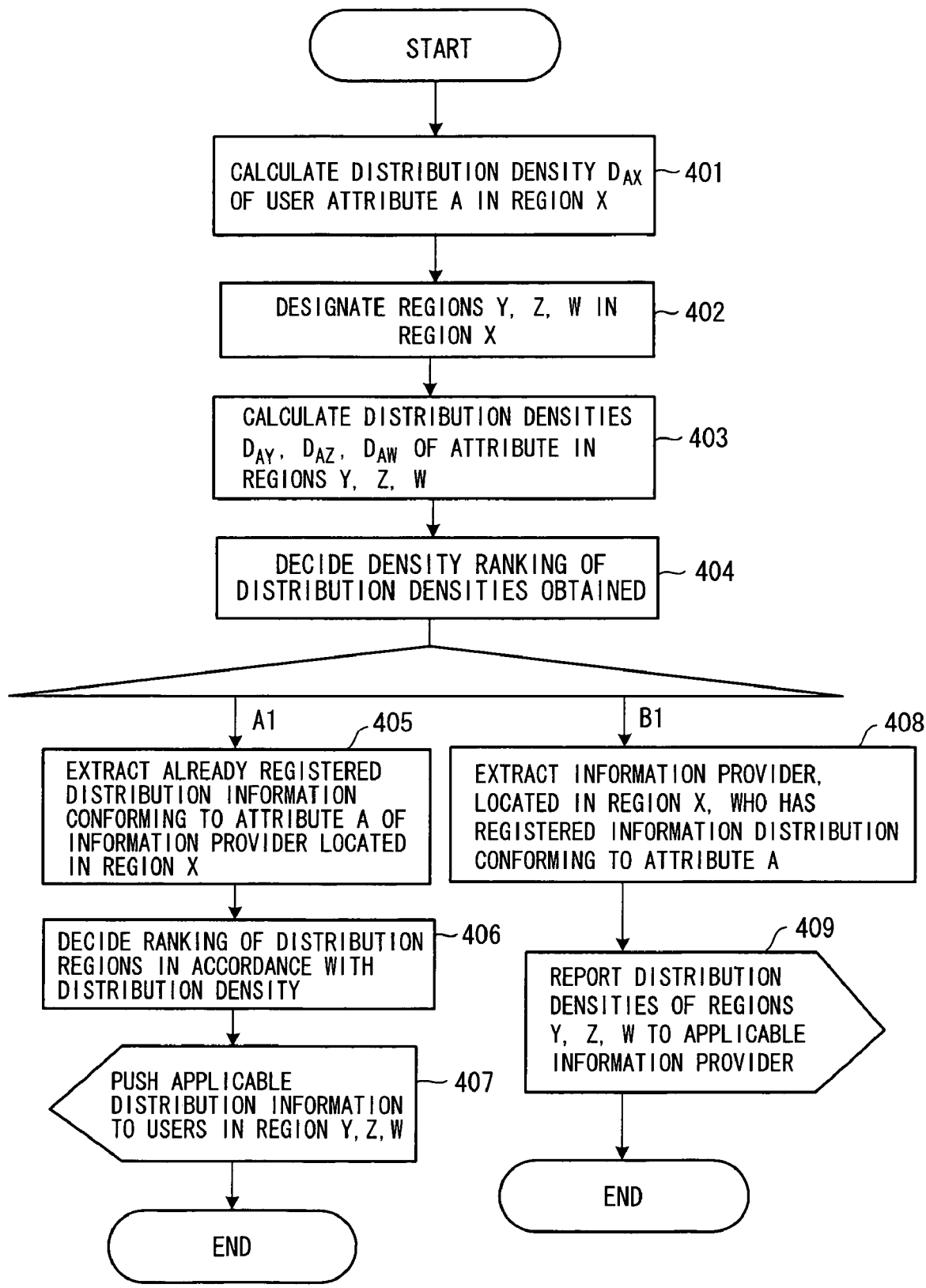
FIG. 18 is a processing flowchart of the fourth embodiment.

FIG. 18 is a flowchart of processing according to the fourth embodiment.

First, the distribution density $D_{AX}$ of attribute A of users in region X is calculated (step 401). Next, regions Y, Z, W in region X are designated (step 402) and the distribution densities $D_{AY}$, $D_{AZ}$, $D_{AW}$ of attribute A in regions Y, Z, W are calculated (step 403). If the distribution densities $D_{AY}$, $D_{AZ}$, $D_{AW}$ have been calculated, then the density ranking of these distribution densities is decided (step 404).

Processing A1, B1 is thenceforth executed in the order mentioned. Which of processing A1, B1 is executed depends upon an agreement with the information provider.

In the flow of processing A1, already registered distribution information that conforms to attribute A of an information provider located in region X is extracted (step 405). Next, the ranking of regions to which information is to be distributed is decided in accordance with the distribution density (step 406) and the applicable distribution information is distributed (pushed) to the users in regions Y, Z, W in this order (step 407).

Next, in the flow of processing B1, an information provider that is located in region X and has registered information distribution that conforms to attribute A is extracted (step 408) and the distribution densities of each of the regions (Y, Z, W) are reported to the applicable information provider (step 409).

(e) Fifth Embodiment

Figure 19:
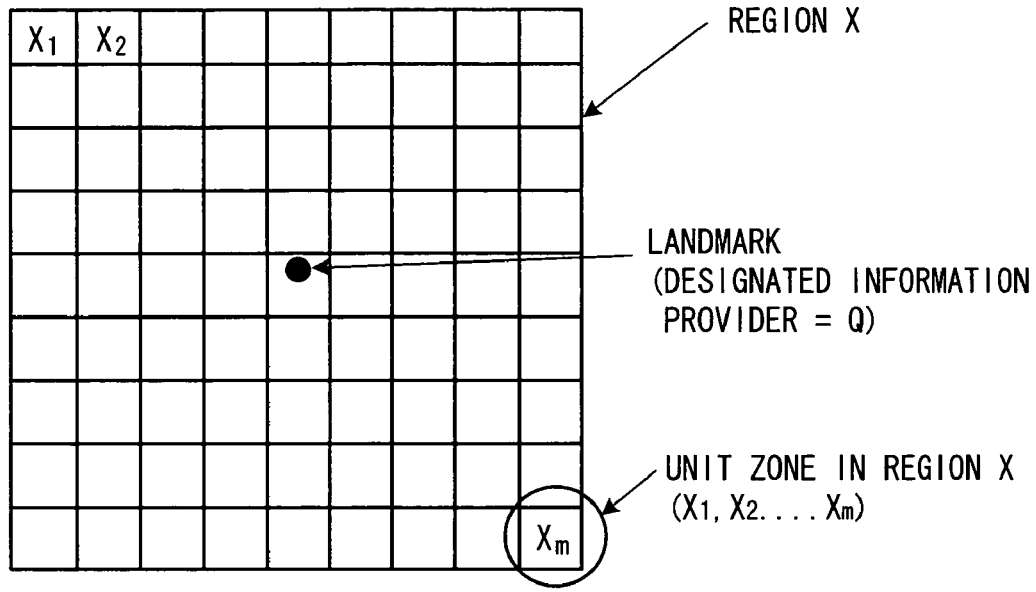
FIG. 19 is a diagram useful in describing a fifth embodiment of the present invention.

FIG. 19 is a diagram useful in describing a fifth embodiment.

The server system (ASP) regards a designated information provider Q as a landmark and, in accordance with the degree of scattering (variance) of the distribution of attributes of designated users in region X that is centered on this landmark, decides a method (① to ③ below) of distributing information to the region X.

① If the information provider Q has already registered information distribution conforming to a plurality of user attributes, the server system (ASP) decides the order of priority (distribution ranking) of distribution of information to the region X.

② In accordance with the state of distribution (the degree of scattering) of applicable users in region X, the information distribution frequency and a technique such as concentrated distribution in a certain time frame are decided.

③ In a case where the information provider Q has registered an information announcement conforming to a plurality of user attributes, the degree of scattering of each of the user attributes is reported to the information provider Q and provision of information distributed from the information provider Q is prompted.

Figure 20:
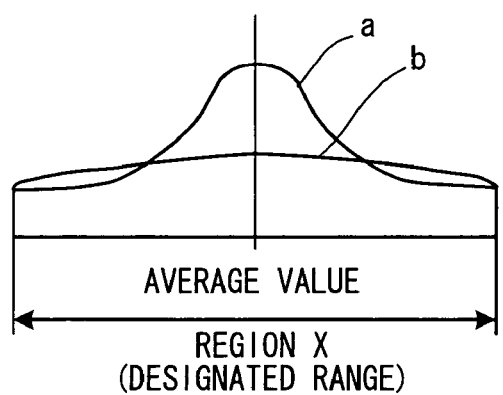
FIG. 20 illustrates a standard deviation in the vicinity of a landmark.

The degree to which service users gather in the vicinity of the landmark can be obtained by repeatedly comparing the distribution density of users in each unit zone in the vicinity of the landmark Q and the distribution density of users in each unit zone in the vicinity of the periphery of the region X. Another method is to obtain a standard deviation ($=S_{AX}$) of distribution density in the vicinity of the landmark Q, as shown in FIG. 20, and then make a determination based thereon. More specifically, average density $D_{A\overline{X}}$ is calculated from distribution densities ($D_{AX1}$, $D_{AX2}$, . . . , $D_{AXm}$) of attribute A in zones ($X_1, X_2, \ldots, X_m$) obtained by subdividing region X, the standard deviation $S_{AX}$, which indicates the degree of scattering, is obtained from the equation indicated below, and the degree of gathering of attribute A in the vicinity of the landmark is determined based upon the standard deviation $S_{AX}$.

$$S_{AX} = \sqrt{S_{AX}^2}$$

[where $S_{AX}^2 = \dfrac{(D_{AX1} - D_{A\overline{X}})^2 + (D_{AX2} - D_{A\overline{X}})^2 + \cdots (D_{AXm} - D_{A\overline{X}})^2}{M-1}$ and $D_{A\overline{X}}$ is an average density]

Figure 21:
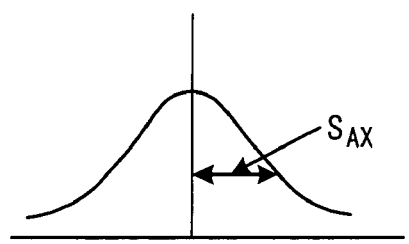
FIG. 21 illustrates a standard deviation $S_{AX}$.

The standard deviation $S_{AX}$ is a value indicated in FIG. 21. The fact that the standard deviation $S_{AX}$ is large means that the variance in density is large, i.e., that there is a large deviation in distribution. This makes it possible to estimate where users will concentrate (see a in FIG. 20). Conversely, the smaller the standard deviation, the more uniform the distribution becomes (see b in FIG. 20).

Figure 22:
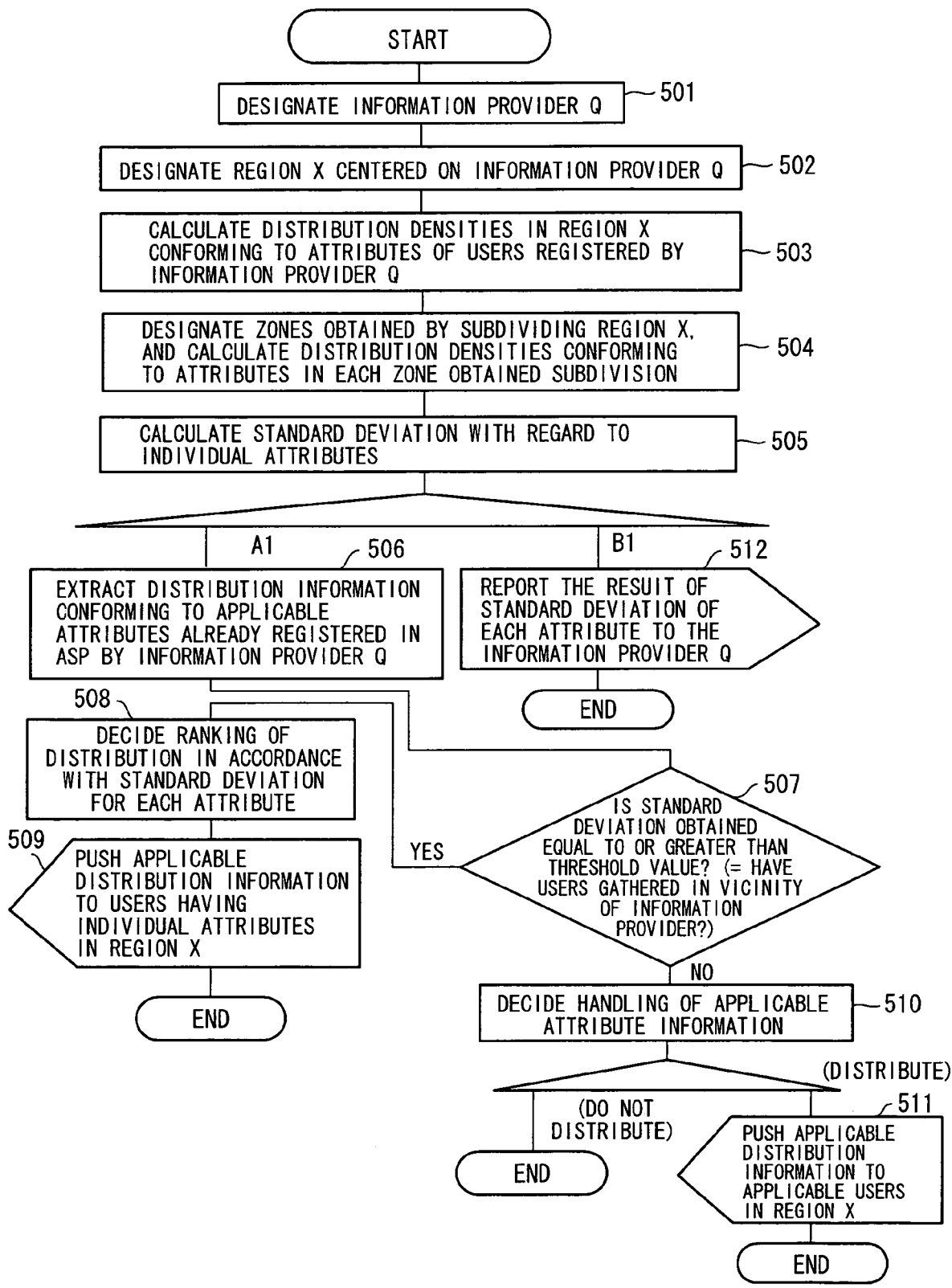
FIG. 22 is a processing flowchart of the fifth embodiment.

FIG. 22 is a flowchart of processing according to the fifth embodiment.

The information provider Q is designated (step 501) and region X centered on the information provider Q is designated (step 502). Next, the distribution densities in region X conforming to the attributes of users registered by the information provider Q are calculated (step 503). For example, in a case where the information provider Q has registered information distribution with respect to user attributes A, B, C, the distribution densities of these attributes are calculated.

The distribution densities conforming to attributes with regard to each of the unit zones in region X are thenceforth calculated (step 504). The standard deviation is calculated with respect to each individual attribute using the distribution densities obtained above (step 505).

Processing A1, B1 is thenceforth executed in the order mentioned. Which of processing A1, B1 is executed depends upon an agreement with the information provider.

In the flow of processing A1, distribution information that conforms to applicable attributes already registered in the ASP by the information provider Q is extracted (step 506).

It is determined whether the standard deviation obtained is equal to or greater than a threshold value, i.e., whether users have gathered (step 507).

If the standard deviation is equal to or greater than the threshold value, this means that there is a location where users have gathered. Accordingly, the ranking of distribution is decided in accordance with the standard deviation for each attribute (step 508) and the applicable distribution information is distributed (pushed) to the users having individual attributes in region X (step 509).

On the other hand, if it is found at step 507 that the standard deviation is less than the threshold value, handling of the information relating to the applicable attribute is decided (step 510). If it is decided not to distribute information, then no distribution is made. If it is decided to distribute information, the applicable distribution information is distributed to applicable users in region X (step 511). In order to determine whether or not to distribute information, it is necessary to previously define or designate distribution conditions for such cases in the registered conditions of the information provider.

If processing in accordance with the flow of A1 is completed, then the result of standard deviation of each attribute is reported to the information provider Q in the flow of B1.

For example, in a case where the obtained standard deviations have the ranking $S_{AX}$, $S_{BX}$, $S_{CX}$, this means that the users of attribute A have gathered most densely in the vicinity of information provider Q and therefore attribute A is given precedence with regard to order of priority and frequency of distribution of distribution information.

It should be noted that if the information provider is a retailer or distributor, then a method such as distributing concentrated information in a short period of time in order to increase patronage at one's store can be adopted at step 508. Further, the effectiveness of distribution can be enhanced by narrowing and limiting a region to which information is distributed from the region X to the vicinity of the information provider Q (landmark) at step 509.

(f) Sixth Embodiment

Figure 23:
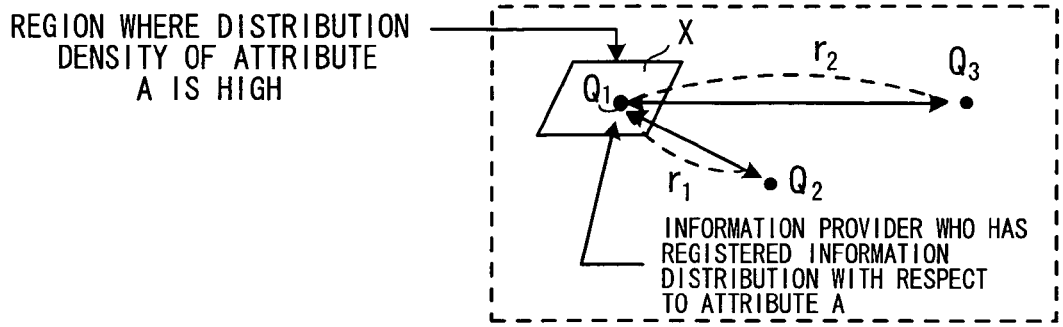
FIG. 23 is a diagram useful in describing a sixth embodiment of the present invention.

FIG. 23 is a diagram useful in describing a sixth embodiment. Here X represents a region in which the distribution density of attribute A is high, and $Q_1$ represents an information provider, located in region X, that has registered information distribution with respect to attribute A. Information providers $Q_2$ and $Q_3$ also have registered information distribution with respect to attribute A. The only difference in conditions is the difference from the region X.

It is inevitable that the manner in which the information distributed to users having attribute A in region will differ between information provider $Q_1$ and the information providers $Q_2$, $Q_3$. For example, if the information provider is a retailer or distributor and engages in a business such as sale of merchandise, then a necessary condition will be that distances $r_1$, $r_2$ between region X and $Q_2$, $Q_3$ be capable of being travelled during a user's daily activity in order to attract users distributed at high density in region X and thereby achieve sales (patronage at the store). Just because Kyushu has a region of high distribution density does not mean that it is necessary for a store located in Tokyo to distribute information to the Kyushu district.

The server system (ASP) discriminates the type of business conducted by an information provider and seeks provision of information that covers the content of information to be distributed to this information provider taking into consideration time and the distance to the region of distribution of the attribute of users to which this information provider intends to distribute information.

Figure 24:
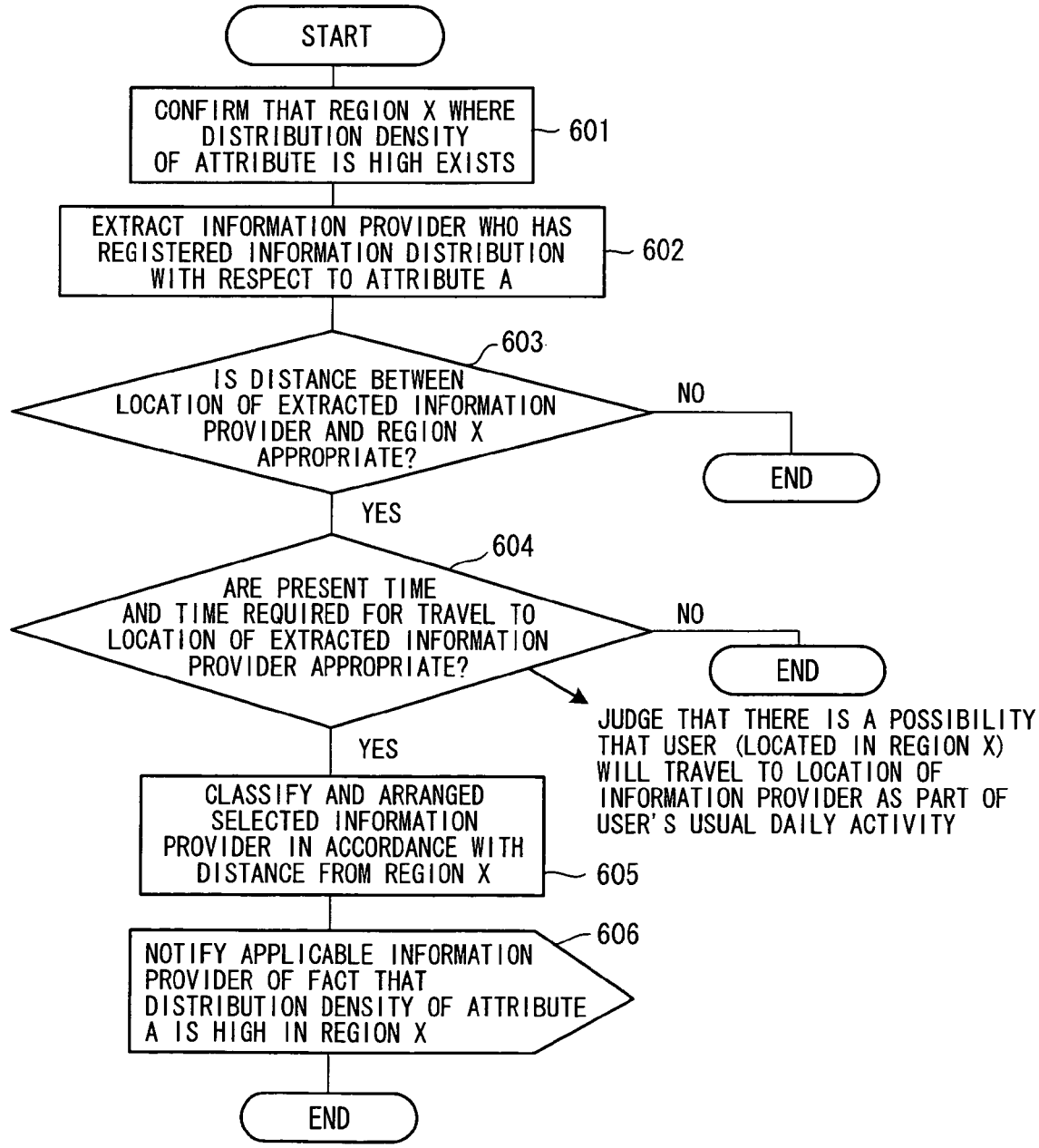
FIG. 24 is a processing flowchart of the sixth embodiment.

FIG. 24 is a flowchart of processing according to the sixth embodiment.

The server system (ASP) confirms that region X where the distribution density of attribute A is high exists (step 601). An information provider that has registered information distribution with respect to attribute A is extracted (step 602). It is determined whether the distance between the location of the extracted information provider and region X is a distance for which the sending of information is appropriate (step 603). If the distance is not appropriate, processing is terminated.

If the distance is appropriate, on the other hand, the server system (ASP) determines whether arrival time is appropriate (step 604). This determination is made based upon the present time and the time required for travel to the location of the extracted information provider. It is judged that there is a possibility that a user (who is located in region X) will travel to the location of the information provider as part of his or her usual daily activity.

If the location of the extracted information provider cannot be reached at the appropriate time, then processing is terminated. On the other hand, if this location can be reached at the appropriate time, then the selected information provider is classified and arranged in accordance with distance from region X (step 605). The applicable information provider is notified of the fact that the distribution density of attribute A is high in region X (step 606).

(g) Seventh Embodiment

In a seventh embodiment, time and a region where the density of a specific attribute is high are predicted based upon a prediction formula for predicting a time-series change in user distribution and the result of the prediction is reported to the information provider to enhance the announcement effectiveness of the distributed information content.

Figure 25:
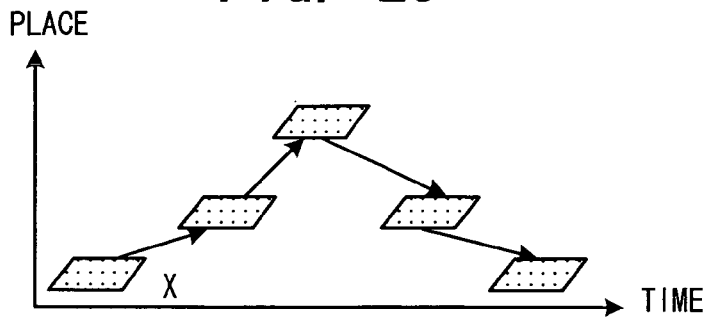
FIG. 25 illustrates the manner in which a region (location) of high distribution density varies.
Figure 26:
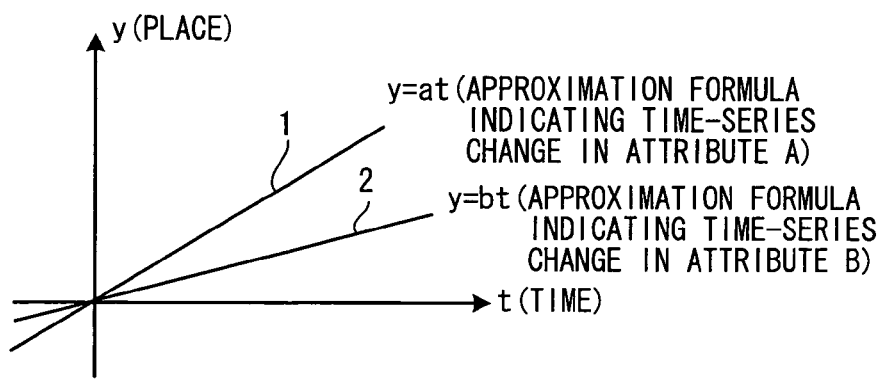
FIG. 26 illustrates an example in which a regional displacement in distribution density is expressed by a function.

In regard to a certain attribute, it is predicted that a region (place) X of high distribution density will change with a change in time, as shown in FIG. 25 (region also changes in a time series). Accordingly, the server system (ASP) is capable of raising the accuracy of prediction of regional displacement (a characteristic) of user-attribute distribution density based upon accumulation of passed time and accumulation of data. The server system (ASP) infers that this displacement can be approximated by the approximation formulae of the kind shown in FIG. 26 by way of example. In FIG. 26, reference numeral 1 denotes an approximation formula, which is expressed by y=at, that indicates a time-series change in attribute A, and reference numeral 2 denotes an approximation formula, which is expressed by y=bt, that indicates a time-series change in attribute B. The unit of change in the time series can be taken as "one day", "a day of the week", "fiscal month" or "fiscal year".

Figure 27:
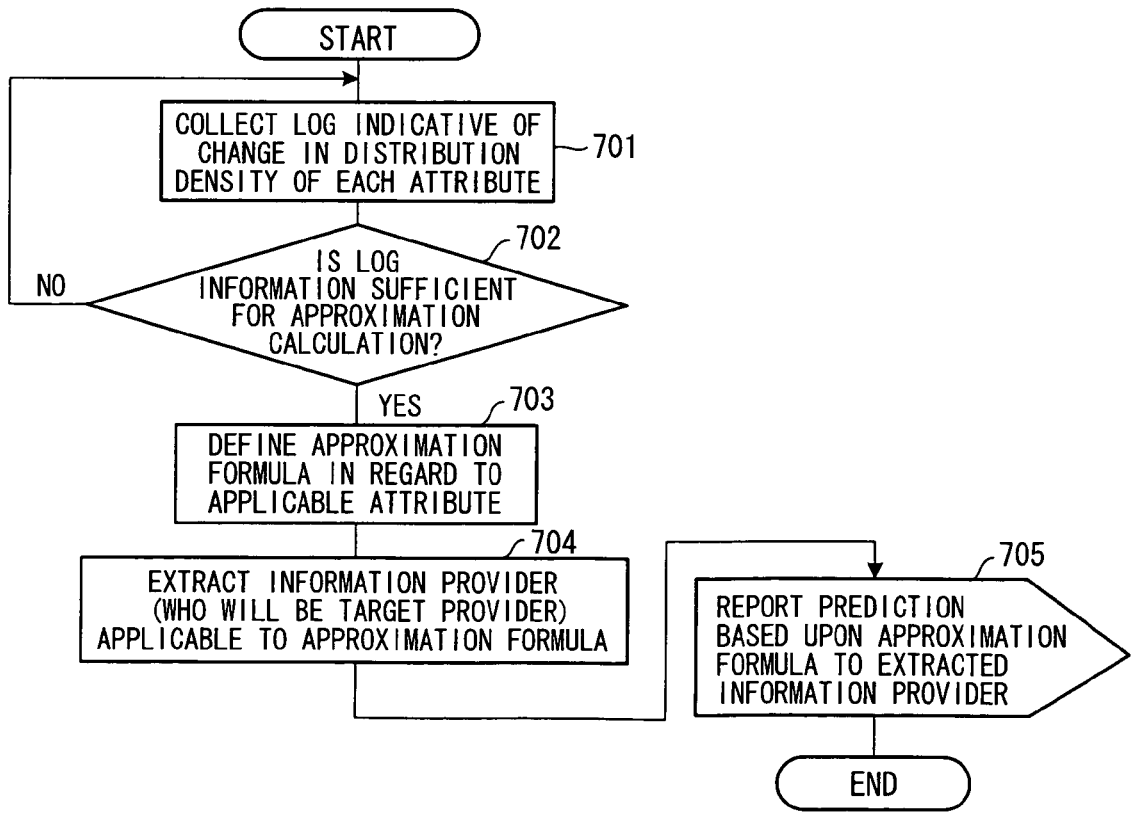
FIG. 27 is a processing flowchart of a seventh embodiment.

FIG. 27 is a flowchart of processing according to the seventh embodiment. Here a region and time where the distribution density of a prescribed attribute will be high are predicted by an approximation formula that indicates a time-series change obtained by the server system (ASP) and the result of the prediction is reported to an information provider to make it possible to raise the announcement effectiveness of the content of information to be distributed.

First, the server system (ASP) collects log information indicating the change in distribution density of each attribute (step 701). Next, the server system (ASP) checks to determine whether such change-log information sufficient for the approximation calculation has been collected (step 702). Collection continues if it has not been collected. If such log information has been collected, then the server system (ASP) defines the approximation formula in regard to the applicable attribute (step 703). The server system (ASP) then extracts an information provider (target information provider) that is applicable to a location of high distribution density obtained by the approximation formula (step 704). Thereafter, the server system (ASP) notifies the extracted information provider of the prediction that is based upon the approximation formula (step 705).

(h) Eighth Embodiment

An eighth embodiment is an embodiment for a case where a content provider, which provides information such as event information, traffic information, airline information and parking information, is the information provider.

Figure 28:
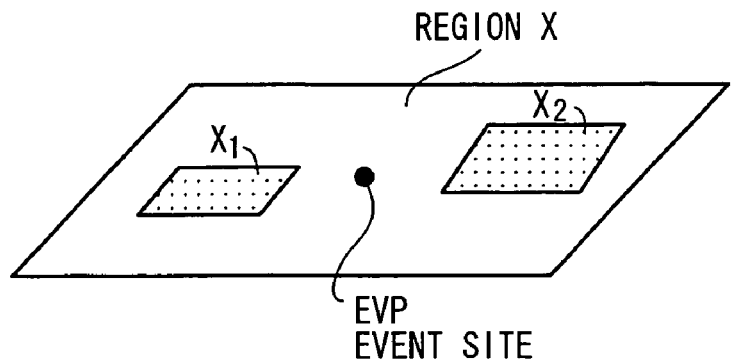
FIG. 28 is a diagram useful in describing an eighth embodiment of the present invention.

Owing to changes in behavior with the diversification of consumer values, it has become necessary to take into consideration the need to raise utility value relative to the information provided by content providers as well as the economy (cost effectiveness) of such information. The distribution of certain event information will be described as one example. FIG. 28 illustrates that the distribution of service users who are highly interested in a certain event and have registered for provision of this type of information is high in zones $X_1$ and $X_2$ in region X, which includes a site EVP where the event is held. In this case, rather than announcing the holding of the event over the entirety of region X, a higher cost effectiveness, i.e., a higher distribution effectiveness, can be expected if the information is distributed to zones $X_1$ and $X_2$ where there is a higher density of users who desire this type of information. This means that the distribution of applicable users (the degree to which the users will gather) is a guideline (measure) of economic rationality and distribution effectiveness. In this embodiment, a content provider is the information provider.

Figure 29:
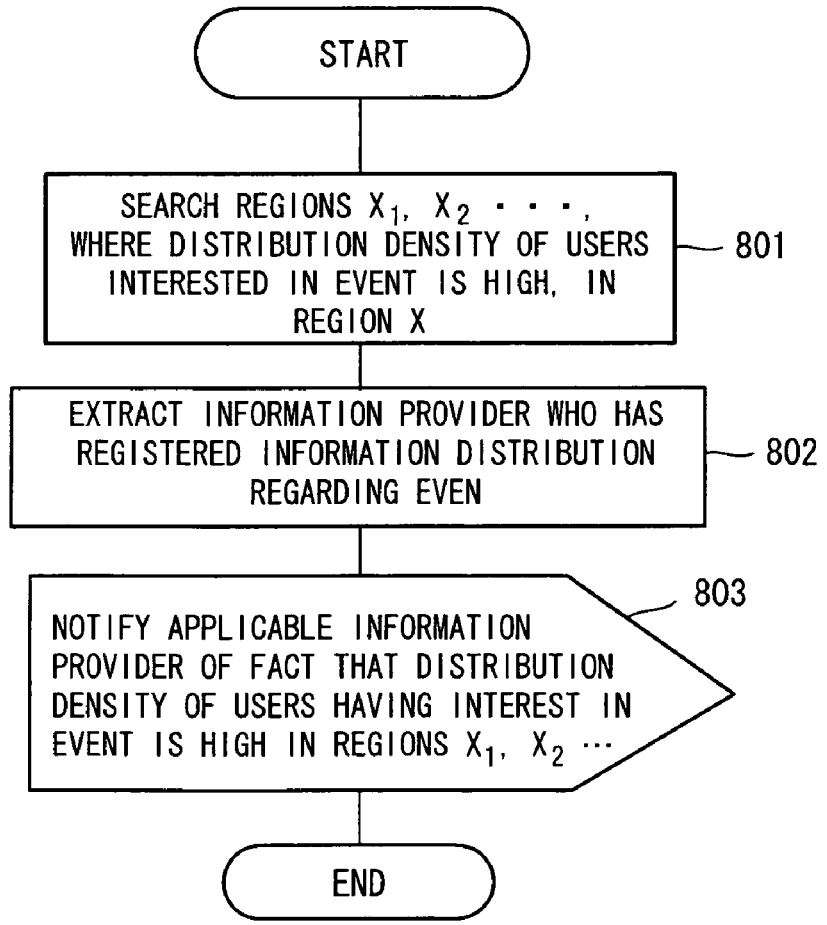
FIG. 29 is a processing flowchart of the eighth embodiment.

FIG. 29 is a flowchart of processing according to the eighth embodiment.

The server system (ASP) searches regions $X_1$, $X_2$, where the distribution density of users interested in the event is high, in region X (step 801). The server system (ASP) extracts an information provider (content provider) that has registered information distribution with regard to the event (step 802) and notifies the content provider of the fact that the distribution density of users having an interest in the event is high in regions X1, X2 (step 803).

FIG. 30 is a diagram illustrating the configuration of the system on the side of the content provider in the eighth embodiment. Here a report acceptance processor 81 of the content provider accepts results of an investigation, which relates to the state of distribution (state of gathering) of service users who seek distribution information (attributes) in the designated region X, from the ASP via an ASP interface processor 80, and stores these results in a report receiving log RLDB.

Next, on the basis of the results of the investigation by the ASP, a report acceptance processor 82 extracts content, which is to be distributed, from a distribution content master database (CMTDB) being maintained and managed on the side of the content provider, and stores this content in a distribution-target content database (DOCDB).

A report acceptance processor 83 then edits the distribution contents, while taking into consideration conditions such as the distribution ranking and frequency of content to be distributed, based upon the results of the investigation by the server system (ASP) and contract conditions registered beforehand by the content provider, and stores the results of editing in an edited-distribution content database (EDCDB). A distribution content transmitting processor 84 requests the server system (ASP) to distribute distribution content, which has been stored in the edited-distribution content database (EDCDB), to the users.

(i) Modification

As indicated by the embodiments above, an advantage of the present invention is that it is possible to distribute information more effectively upon ascertaining dynamic changes in the movements of consumers in everyday life space. In other words, the present invention makes possible dynamic marketing customized to consumers and in an environment in which the movements of these consumers are changing in everyday space. This is difficult to realize with conventional marketing.

Until now, demand predictions such as predictions of proceeds when stores are opened and predictions of store patronage have been obtained in the field of retailing and distribution based upon several laws such as Reilly's Law, Converse's Formula and Huff's Model. However, these are founded on a common approach in which all are based upon the population of a target region. Population, however, is nothing more than a static factor. The mobility of consumers in everyday space is growing owing to the advance of transportation facilities and the spread of means of communication, and consumption has become more fluid owing to diversification of user preferences. Under these circumstances, it is difficult to expect satisfactory results by relying solely upon the demand prediction techniques used heretofore.

Accordingly, distribution densities Pa, Pb in a region in which users having attributes a, b are present and distances Da, Db to an information provider are applied to Reilly's Law. If this arrangement is adopted, it can be determined to which user of users having attributes a, b precedence should be given in distributing information and the information content conforming to the attribute can be decided accordingly.

Further, distribution densities Pa, Pb in a region in which users having attributes a, b are present and a distance Dab between these regions are applied to Converse's Formula. If this arrangement is adopted, the business area branch points of an information provider can be found and the range of information distribution can be ascertained based upon the business area branch points.

Further, store area in Huff's Model is adopted as information distribution frequency of a designated information provider in an applicable region, and n is adopted as an information provider of the same type of business located in this region, thereby making it possible to calculate the probability of movement from a region i to a region j.

The present invention makes it possible to predict daily dynamic (real-time) movement of consumers in the manner described above.

In accordance with the present invention, it is so arranged that an information provider instructs a server system of an information distribution region and attributes of service users, the state of distribution of service users who have the above-mentioned attributes in the information distribution region designated by the information provider is monitored based upon position information from the service users, and prescribed information is distributed to mobile information terminals of the service users based upon the state of the distribution. As a result, a high advertising effectiveness can be expected.

Further, in accordance with the present invention, information can be distributed as follows and not merely to an area decided at a predetermined time: Specifically, the distribution of mobile information terminals at a certain time is ascertained and a region of high terminal density or a region in which a large number of users are located is reported to an information provider to prompt the distribution of information. As a result, a high advertising effectiveness can be expected.

Further, in accordance with the present invention, the movement of mobile information terminals as a group is ascertained. This makes it possible to predict this movement and propose it to the information provider in such a manner that at a time judged to be a suitable number of hours ahead of a time at which a large number of users will gather in a certain region, an advertisement will be distributed to the area where the users who will gather at the above-mentioned region are located. As a result, a high advertising effectiveness can be expected.

Further, the present invention is capable of presenting a method of evaluating, quantitatively to some degree, how the movement of a group of mobile information terminals changed owing to an advertisement, and is capable of furnishing data thus obtained to an information provider.

In accordance with the present invention, real-time, dynamic marketing (analysis and prediction of consumer conduct) becomes possible.

Further, in accordance with the present invention, objective evaluation of the effectiveness of information distribution becomes possible by receiving and storing the reaction of users to distributed information. On the basis of this evaluation, an information provider can be furnished with advice regarding a target area of information distribution and the content of distributed information, and this advice service can be furnished for pay.

As many apparently widely different embodiments of the present invention can be made without departing from the spirit and scope thereof, it is to be understood that the invention is not limited to the specific embodiments thereof except as defined in the appended claims.

What is claimed is:

1. An information distribution service providing system which has a server system and at least one information provider terminal connected to the server system, for distributing information designated by an information provider, via a network from the server system to mobile information terminals of service users for which utilization of an information providing service has been registered, wherein said information provider terminal includes means for designating, to the server system, information for distributing, an information distribution region and attributes of service users; and said server system includes:

calculation means for calculating, based upon position information from service users for which utilization of an information providing service has been registered, a distribution density of service users who have said attributes for each zone in the information distribution region designated by the information provider;

means for distributing preferentially the information designated by the information provider to mobile information terminals of service users who have said attributes and are present in the zones of high distribution density;

means for accepting and storing reaction of the service users to the distributed information;

means for analyzing the accepted user reaction; and means for statistically processing results of the analysis and outputting a report.

2. The information distribution service providing system according to claim 1, wherein said analyzing means analyzes the accepted user reaction based on a time from moment of distribution to user response and information indicating position of the user at this time.

3. The information distribution service providing system according to claim 1, further comprising:

means for reporting the obtained statistical results to the information provider.

4. The information distribution service providing system according to claim 1, wherein said distributing means decides information distribution frequency and information distribution order in dependence upon the distribution density and delivers the information designated by the information provider to the service user based on the decided information distribution frequency and information distribution order.

* * * * *